United States Patent
Kounavis et al.

(10) Patent No.: US 10,929,527 B2
(45) Date of Patent: Feb. 23, 2021

(54) METHODS AND ARRANGEMENTS FOR IMPLICIT INTEGRITY

(71) Applicant: INTEL CORPORATION, Santa Clara, CA (US)

(72) Inventors: Michael Kounavis, Portland, OR (US); David Durham, Beaverton, OR (US); Sergej Deutsch, Hillsboro, OR (US); Saeedeh Komijani, Mountain View, CA (US); Amitabh Das, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 156 days.

(21) Appl. No.: 15/848,962

(22) Filed: Dec. 20, 2017

(65) Prior Publication Data

US 2019/0042734 A1 Feb. 7, 2019

(51) Int. Cl.
| | |
|---|---|
| *G06F 21/55* | (2013.01) |
| *G06F 21/54* | (2013.01) |
| *H04L 9/06* | (2006.01) |
| *H04L 9/32* | (2006.01) |
| *G06F 11/00* | (2006.01) |

(52) U.S. Cl.
CPC .............. *G06F 21/54* (2013.01); *G06F 11/00* (2013.01); *H04L 9/0643* (2013.01); *H04L 9/3239* (2013.01); *H04L 9/3242* (2013.01); *G06F 2221/033* (2013.01); *H04L 2209/122* (2013.01); *H04L 2209/34* (2013.01)

(58) Field of Classification Search
CPC ....... G06F 21/00; G06F 21/554; G06F 21/562
See application file for complete search history.

(56) References Cited

U.S. PATENT DOCUMENTS

| | | | | |
|---|---|---|---|---|
| 2007/0152854 | A1* | 7/2007 | Copley | G06F 21/562 341/51 |
| 2008/0201779 | A1* | 8/2008 | Tahan | G06F 21/564 726/23 |
| 2017/0323118 | A1* | 11/2017 | Fink | G06F 21/6245 |

* cited by examiner

*Primary Examiner* — Olugbenga O Idowu
(74) *Attorney, Agent, or Firm* — Kacvinsky Daisak Bluni PLLC

(57) ABSTRACT

Logic may implement implicit integrity techniques to maintain integrity of data. Logic may perform operations on data stored in main memory, cache, flash, data storage, or any other memory. Logic may perform more than one pattern check to determine repetitions of entities within the data. Logic may determine entropy index values and/or Boolean values and/or may compare the results to threshold values to determine if a data unit is valid. Logic may merge a tag with the data unit without expanding the data unit to create an encoded data unit. Logic may decode and process the encoded data unit to determine the data unit and the tag. Logic may determine value histograms for two or more entities, determine a sum of repetitions of the two or more entities, and compare the sum to a threshold value. Logic may determine that a data unit is valid or is corrupted.

18 Claims, 18 Drawing Sheets

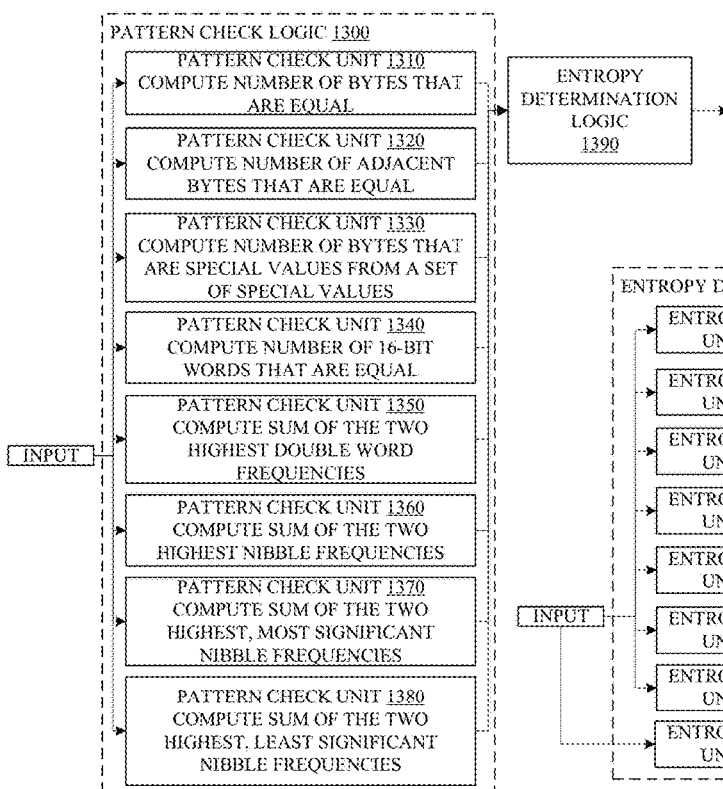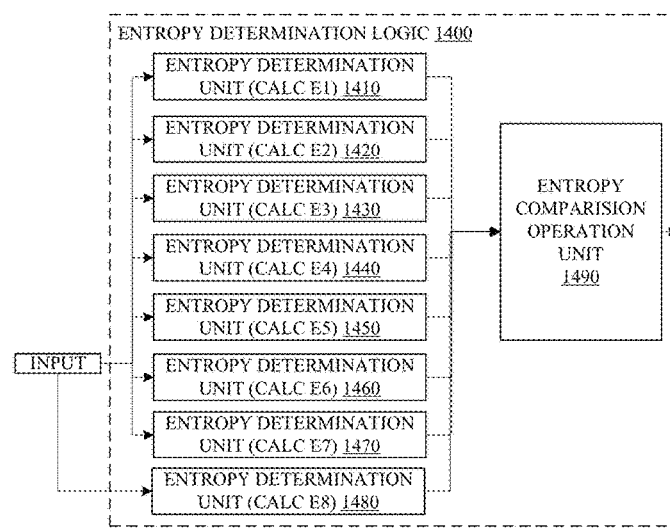

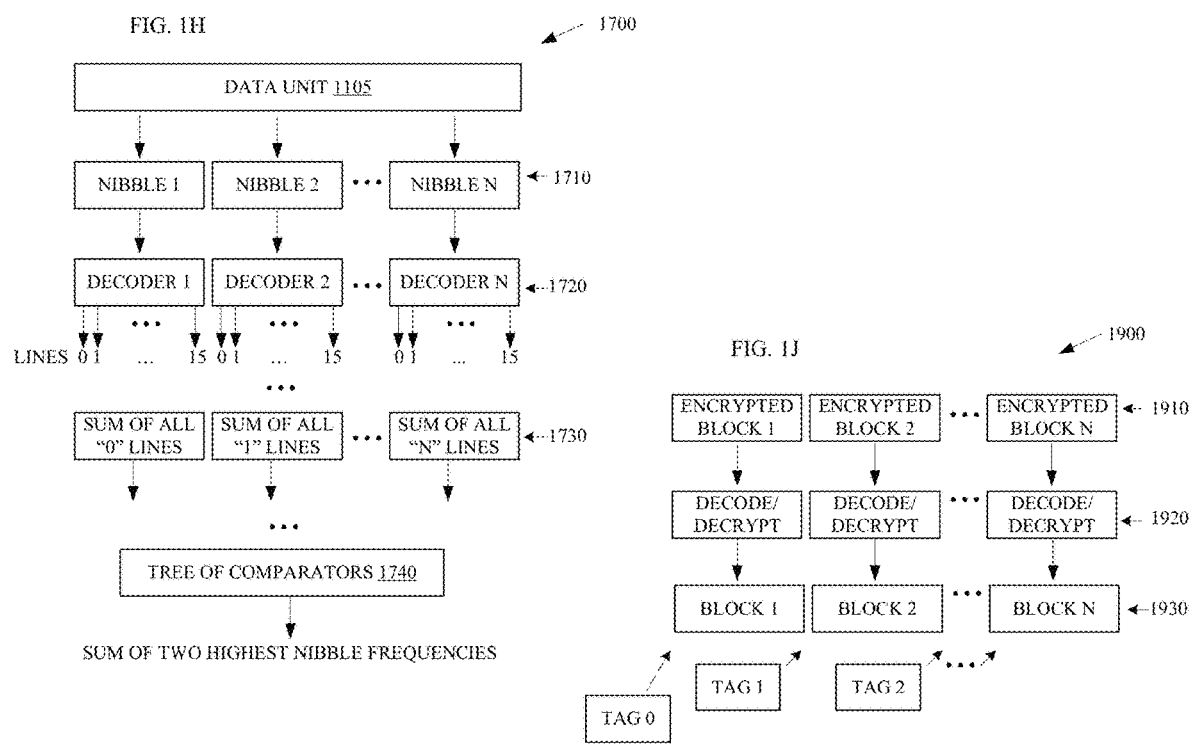

```
bool extended_pattern_matching(char *data, bool *attention,
        pattern_matching_params_t epm_params,
        pattern_matching_params_t attention_params)
{
        //returning true means it passes - false it fails
        bool ret_val = true;
        *attention = false;
        int v1 = get_two_highest_nibble_frequencies(data, 64), v2, v3, v4, v5, v6;
        if (v1 < epm_params->two_highest_nibble_freq)
        {
                v2 = get_max_number_repeated_words((char *)data, 64);
                if (v2 < epm_params->max_num_rep_words)
                {
                        v3 = get_max_number_special_bytes((char *)data, 64);
                        if (v3 < epm_params->max_num_special_bytes)
                        {
                                v4 = get_max_number_equal_adjacent_bytes((char *)data, 64);
                                if (v4 < epm_params->max_num_eq_adj_bytes)
                                {
                                        v5=get_two_highest_dword_frequencies((char *)data, 64);
                                        if (v5 < epm_params->two_highest_dword_freq)
                                        {
                                                v6 = get_two_highest_ms_nibble_frequencies
                                (data, 64);
                                                if (v6 < epm_params->two_highest_ms_nib_freq)
                                                {
                                                        ret_val = false;
                                                }
                                        }
                                }
                        }
                }
        }
        if (attention_params != NULL)
        {
                if (((((v1 >= attention_params->two_highest_nibble_freq) &&
                        (v1 <= epm_params->two_highest_nibble_freq)) ||
                        ((v2 >= attention_params->max_num_rep_words) &&
                        (v2 <= epm_params->max_num_rep_words)) ||
                                ((v3 >= attention_params->max_num_special_bytes) &&
                        (v3 <= epm_params->max_num_special_bytes)) ||
                                        ((v4 >= attention_params->max_num_eq_adj_bytes) &&
                        (v4 <= epm_params->max_num_eq_adj_bytes)) ||
                                        ((v5 >= attention_params->two_highest_dword_freq) &&
                        (v5 <= epm_params->two_highest_dword_freq)) ||
                                        ((v6 >= attention_params->two_highest_ms_nib_freq) &&
                        (v6 <= epm_params->two_highest_ms_nib_freq))) &&
                                                        (ret_val == false))
                        *attention = true;
        }
        return ret_val;
}
```

FIG 1K: Pattern Checking Using Thresholds

```
int    eval_deterministic_behavior_on_cl(char *data,
deterministic_behavior_cl_data_t behavior, security_tables tables)
{
        double p = 0.0;
        int freq = 0;
        deterministic_behavior_type type = TWO_HIGHEST_NIBBLE_FREQ;
        double max_security = -1;
        double cumulative_security = 0;
        deterministic_behavior_type best_type = NO_BEHAVIOR;
        if (behavior->cl_data[type].relevance == true)
        {
                behavior->cl_data[type].type = type;
                freq = get_two_highest_nibble_frequencies(data, 64);
                behavior->cl_data[type].frequency = freq;
                behavior->cl_data[type].security = tables[type][freq];
                max_security = behavior->cl_data[type].security;
                best_type = type;
                cumulative_security = pow(2, -1 * max_security);
        } type = MAX_NUM_REP_WORDS;
        if (behavior->cl_data[type].relevance == true)
        {
                behavior->cl_data[type].type = type;
                freq = get_max_number_repeated_words(data, 64);
                behavior->cl_data[type].frequency = freq;
                behavior->cl_data[type].security = tables[type][freq];
                if (behavior->cl_data[type].security > max_security)
                {
                        max_security = behavior->cl_data[type].security;
                        best_type = type;
                        cumulative_security = pow(2, -1 * max_security);
                }
        }
        type = MAX_NUM_SPECIAL_BYTES;
        if (behavior->cl_data[type].relevance == true)
        {
                behavior->cl_data[type].type = type;
                freq = get_max_number_special_bytes(data, 64);
                behavior->cl_data[type].frequency = freq;
                behavior->cl_data[type].security = tables[type][freq];
                if (behavior->cl_data[type].security > max_security)
                {
                        max_security = behavior->cl_data[type].security;
                        best_type = type;
                        cumulative_security = pow(2, -1 * max_security);
                }
        }
```

FIG. 1L(a): Extended Pattern Matching Using Entropy Index Values

```
type = MAX_NUM_EQ_ADJ_BYTES;
if (behavior->cl_data[type].relevance == true)
{
        behavior->cl_data[type].type = type;
        freq = get_max_number_equal_adjacent_bytes(data, 64);
        behavior->cl_data[type].frequency = freq;
        behavior->cl_data[type].security = tables[type][freq];

if (behavior->cl_data[type].security > max_security)
        {
                max_security = behavior->cl_data[type].security;
                best_type = type;
                cumulative_security = pow(2, -1 * max_security);
        }
}
type = TWO_HIGHEST_DWORD_FREQ;
if (behavior->cl_data[type].relevance == true)
{
        behavior->cl_data[type].type = type;
        freq = get_two_highest_dword_frequencies(data, 64);
        behavior->cl_data[type].frequency = freq;
        behavior->cl_data[type].security = tables[type][freq];

if (behavior->cl_data[type].security > max_security)
        {
                max_security = behavior->cl_data[type].security;
                best_type = type;
                cumulative_security = pow(2, -1 * max_security);
        }
}
type = TWO_HIGHEST_MS_NIBBLE_FREQ;
if (behavior->cl_data[type].relevance == true)
{
        behavior->cl_data[type].type = type;
        freq = get_two_highest_ms_nibble_frequencies(data, 64);
        behavior->cl_data[type].frequency = freq;
        behavior->cl_data[type].security = tables[type][freq];

if (behavior->cl_data[type].security > max_security)
        {
                max_security = behavior->cl_data[type].security;
                best_type = type;
                cumulative_security = pow(2, -1 * max_security);
        }
}
```

FIG. 1L(b): Extended Pattern Matching Using Entropy Index Values

```
type = TWO_HIGHEST_LS_NIBBLE_FREQ;
if (behavior->cl_data[type].relevance == true)
{
        behavior->cl_data[type].type = type;
        freq = get_two_highest_ls_nibble_frequencies(data, 64);
        behavior->cl_data[type].frequency = freq;
        behavior->cl_data[type].security =
tables[TWO_HIGHEST_MS_NIBBLE_FREQ][freq];

if (behavior->cl_data[type].security > max_security)
        {
                max_security = behavior->cl_data[type].security;
                best_type = type;
                cumulative_security = pow(2, -1 * max_security);
        }
}
type = MAX_NUM_REP_BYTES;
if (behavior->cl_data[type].relevance == true)
{
        behavior->cl_data[type].type = type;
        freq = get_max_number_repeated_bytes(data, 64);
        behavior->cl_data[type].frequency = freq;
        behavior->cl_data[type].security = tables[type][freq];

if (behavior->cl_data[type].security > max_security)
        {
                max_security = behavior->cl_data[type].security;
                best_type = type;
                cumulative_security = pow(2, -1 * max_security);
        }
} if (max_security < 1.00)
{
        behavior->max_security = 0.0;
        behavior->best_behavior = NO_BEHAVIOR;
        behavior->cumulative_security = 1.0;
}
else
{
        behavior->max_security = max_security;
        behavior->best_behavior = best_type;
        behavior->cumulative_security = pow(2, -1 * max_security);
}
return 1;
}
```

FIG. 1L(c): Extended Pattern Matching Using Entropy Index Values

```
int encode_cache_line_for_compression(bool *encodable, bool *low_entropy,
        char *data_out, char *data_in, uint32_t tag_B,
        rrm_keys_512_bit_t keys, security_tables tables)
{
        int encoding_bits = keys->encoding_bits;
        if ((encoding_bits > 8) || (encoding_bits < 3))
        {
                *encodable = false;
                *low_entropy = false;
                return -1;
        }
        int n = (int)pow(2.0, encoding_bits);
        if (tag_B >= n)
        {
                *encodable = false;
                *low_entropy = false;
                return -1;
        }
        uint32_t mask = (1 << encoding_bits) - 1;
        int best_value_index = 0;
        *encodable = true;

//now that we know all arguments are good we create the table of suggested values;
        char *suggested_values = (char *)malloc(64 * n);
        memset(suggested_values, 0, 64 * n);

//we first encrypt the data with key k_d
        char *a_prime = (char *)malloc(64), *q = (char *)malloc(64);
        char *temp_1 = (char *)malloc(64), *temp_2 = (char *)malloc(64);
        int size_a_prime = 0, size_q, size_tag_B;
        memset(a_prime, 0, 64);
        memset(q, 0, 64);
        memset(temp_1, 0, 64);
        memset(temp_2, 0, 64);

encrypt_cache_line_u_AES_S_2_10(a_prime,
                (char *)(keys->Kdc),
                (char *)&(keys->Kdc[4]),
                (char *)&(keys->Kdc[8]),
                data_in,
                (char *)(keys->iv));
```

FIG. 1M(a): Joint Implicit Integrity and Tag Embedding Without Message Expansion

```
//we then populate the suggested values table
best_value_index = (int)(*((uint32_t *)a_prime) & mask);
memcpy(&suggested_values[64 * best_value_index], data_in, 64);
memcpy(temp_1, a_prime, 64);
int i = 0;
for (i = 0; i < n; i++)
{
        if (i == best_value_index)
                continue;
        *(uint32_t *)temp_1 &= ~mask;
        *(uint32_t *)temp_1 |= i;

decrypt_cache_line_u_AES_S_2_10(temp_2,
                (char *)(keys->Kdc),
                (char *)&(keys->Kdc[4]),
                (char *)&(keys->Kdc[8]),
                temp_1,
                (char *)(keys->iv));
        memcpy(&suggested_values[64 * i], temp_2, 64);
}

//now, the value indexed by best_value_index has to be the least random
//and also associated with a target security value
    deterministic_behavior_cl_data_t behavior_data =
(deterministic_behavior_cl_data_t)malloc(sizeof(deterministic_behavior_cl_data));
    memset(behavior_data, 0, sizeof(deterministic_behavior_cl_data));
    for (i = 0; i < DETERMINISTIC_BEHAVIOR_TYPES; i++)
        behavior_data->cl_data[i].relevance = true;
    eval_deterministic_behavior_on_cl(data_in, behavior_data, tables);
    double security_of_best_value = behavior_data->max_security;
    if (security_of_best_value < keys->min_security)
        *low_entropy = false;
    else
    {
        *low_entropy = true;
        for (i = 0; i < n; i++)
        {
                if (i == best_value_index)
                        continue;
                eval_deterministic_behavior_on_cl(&suggested_values[64 * i],
                        behavior_data, tables);
                if (behavior_data->max_security >= security_of_best_value)
                {
                        *low_entropy = false;
                        break;
                }
        }
    }
}
```

FIG. 1M(b): Joint Implicit Integrity and Tag Embedding Without Message Expansion

```
//now having determined whether this is a low entropy
//cache line or not we proceed with the encoding
  uint32_t *poly = (uint32_t *)malloc(64);
  memset(poly, 0, 64);
  poly[0] = 0x0125; //we go with the simplest polynomial //we determine the sizes of a_prime and tag_B in bits
  int j = 0, bit_val = 0;
  size_a_prime = 0;
  for (j = 511; j >= 0; j--)
  {
        bit_val = extract_bit_at_position((uint32_t *)a_prime, j);
        if (bit_val == 1)
        {
              size_a_prime = j;
              break;
        }
  }
  size_a_prime++;
  size_tag_B = 0;
  for (j = 7; j >= 0; j--)
  {
        bit_val = extract_bit_at_position(&(uint32_t)tag_B, j);
        if (bit_val == 1)
        {
              size_tag_B = j;
              break;
        }
  }
  size_tag_B++;
  uint32_t *temp_3 = 0;
  int size_temp_3 = 0, size_temp_3_words = 0;
  mul_gf2k_any_poly_any_size(512, &temp_3, &size_temp_3, (uint32_t *)a_prime,
              size_a_prime, keys->S1, keys->deg_S1 + 1, poly);
  size_temp_3_words = get_poly_size_in_words(size_temp_3 - 1, 1, 32);
  memcpy(q, temp_3, 4 * size_temp_3_words);
  free(temp_3);
  mul_gf2k_any_poly_any_size(512, &temp_3, &size_temp_3, &(uint32_t)tag_B,
              size_tag_B, keys->S2, keys->deg_S2 + 1, poly);
  size_temp_3_words = get_poly_size_in_words(size_temp_3 - 1, 1, 32);
  for (i = 0; i < size_temp_3_words; i++)
        ((uint32_t *)q)[i] ^= temp_3[i];
  free(temp_3);
```

FIG. 1M(c): Joint Implicit Integrity and Tag Embedding Without Message Expansion

```
        //finally we encrypt the value q in order to produce the encoding
        encrypt_cache_line_u_AES_S_2_10(data_out,
                (char *)(keys->Ke),
                (char *)&(keys->Ke[4]),
                (char *)&(keys->Ke[8]),
                (char *)q,
                (char *)(keys->iv));

free(suggested_values);
        free(a_prime);
        free(q);
        free(temp_1);
        free(temp_2);
        free(behavior_data);
        free(poly);
        return 1;
}
```

FIG. 1M(d): Joint Implicit Integrity and Tag Embedding Without Message Expansion

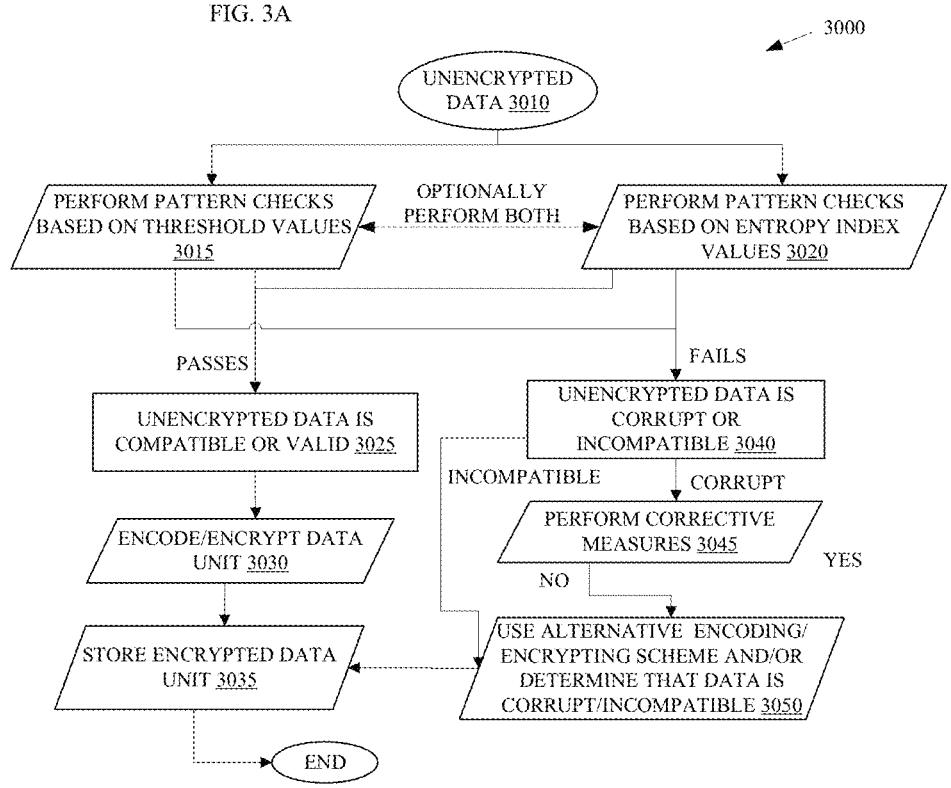

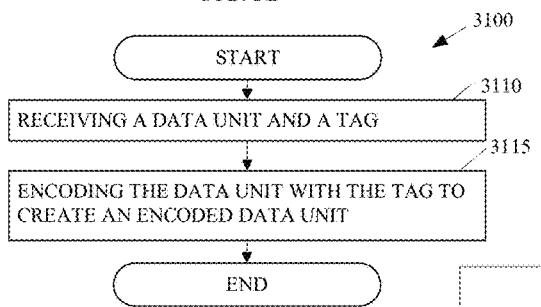
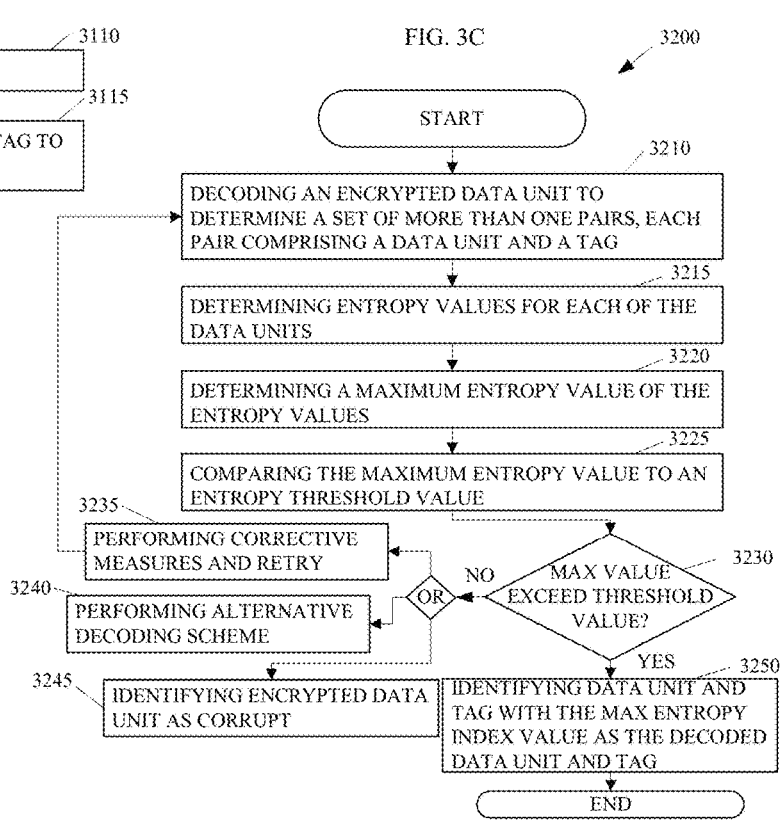

METHODS AND ARRANGEMENTS FOR IMPLICIT INTEGRITY

TECHNICAL FIELD

Embodiments described herein are in the field of the data security. More particularly, the embodiments relate to methods and arrangements to perform implicit integrity operations.

BACKGROUND

The standard way of supporting data integrity is by using Message Authentication Codes (MACs) (or in the case of memory cache line integrity, Integrity Check Values, ICVs) MACs. Cryptographic hash functions (e.g., SHA256, SHA3) produce MACs to store in conjunction with data units, which effectively expands or increases the size of the data unit and results in additional communication overhead. The communication overhead relates to the unavoidable message expansion associated with use of the MACs and ICVs. For example, if a system protects a cache line with an ICV, the system must store the ICV value while storing the cache line and read the ICV value with every cache line read operation. This wastes memory access bandwidth resources as well since each read operation involves two memory read operations. A first memory operation fetches the cache line data and a second memory operation fetches the ICV. Thus, implementation of data integrity measures impacts the performance of applications.

BRIEF DESCRIPTION OF THE DRAWINGS

FIGS. 1C-E depict embodiments of memory logic circuitry to perform implicit data integrity operations such as the memory logic circuitry illustrated in FIG. 1A;

FIG. 1H depicts an embodiment of memory logic circuitry to determine repetitions of entities such as the memory logic circuitry shown in FIG. 1A;

FIG. 1I depicts an embodiment of graph showing the pass rates for cache lines using implicit data integrity and the pass rates for cache lines that either use implicit integrity or use Integrity Check Values (ICVs), which are stored in an ICV cache unit;

FIG. 1J depicts an embodiment of implicit data integrity operations that include error correction codes in tags for correction of corrupted, encoded data units;

FIG. 1K depicts an embodiment of a code snippet to perform pattern checking and to compare repetitions of entities within a data unit against threshold values;

FIG. 1L(A-C) depicts an embodiment of a code snippet to compute entropy index values from repetitions of entities within a data unit;

FIG. 1M(A-D) depicts an embodiment of a code snippet to encode a data unit with a tag to merge the data unit with the tag without message expansion;

FIGS. 3A-C depict flowcharts of embodiments to encrypt and decrypt a data unit with a tag as well as merging the data unit with the tag and demerging the data unit and the tag.

DETAILED DESCRIPTION OF EMBODIMENTS

Figure 1A:
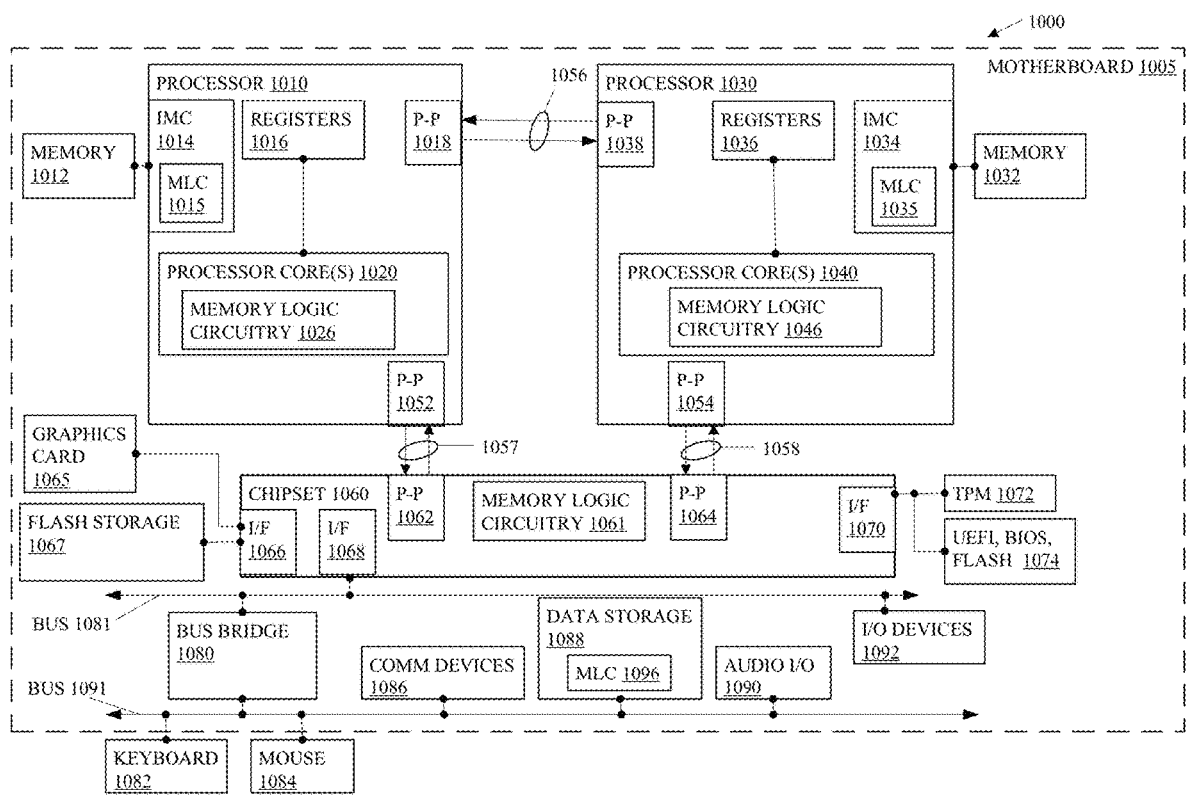
FIG. 1A depicts an embodiment of a system including a multiple-processor platform, a chipset, buses, and accessories.

The following is a detailed description of embodiments depicted in the drawings. The detailed description covers all modifications, equivalents, and alternatives falling within the appended claims.

Embodiments may detect corruption without producing, storing, or verifying mathematical summaries of the content of a data unit. Such summaries, typically known as Message Authentication Codes (MACs) (or in the case of memory cache line integrity, Integrity Check Values, ICVs) are typically costly to maintain and use. Embodiments may implement an alternative methodology, implicit integrity, that uses pattern techniques to support corruption detection for the large majority of user data without message expansion. Many embodiments implement implicit integrity operations for compatible data units and MACs or ICVs for incompatible data units. In some embodiments, an incompatible data unit is an unencoded data unit that does not exhibit sufficient bit patterns in relation to pattern checks performed to ensure a level of security at or above an entropy threshold value. In some embodiments, the entropy threshold value is a setting and, in other embodiments, the entropy threshold value is a fixed value.

Embodiments may comprise memory logic circuitry to implement implicit integrity operations that detect patterns of entities in a data unit such as patterns of two or more bits like nibbles, bytes, words, double-words, or combinations thereof. In some embodiments, the memory logic circuitry compares repetitions of the entities against threshold values to determine if the data unit exhibits at least one of the patterns with greater entity repetition than the corresponding threshold value. The memory logic circuitry may implement threshold values that are based on probabilities that random data will exhibit the repetitions of the entities. One factor in determination of threshold values relates to a balance between the level of security and data pass rates, which are the number of data units that are compatible with implicit integrity operations.

The memory logic circuitry may comprise circuitry to implement implicit integrity operations. In some embodiments, the memory logic circuitry includes code comprising instructions to execute on a processor and the processor to implement implicit integrity operations. The code may be stored in a machine-readable medium, which if executed by a processor cause the processor to perform one or more implicit integrity operations. The processor may be a general-purpose processor such as a main application processor of a computer or a specific-purpose processor designed to perform the implicit integrity operations and/or other tasks. In other embodiments, the memory logic circuitry includes a combination of code, one or more processor(s), and circuitry such as memory, integrated circuits, discrete components, and/or the like, to perform the implicit integrity operations.

In some embodiments, the memory logic circuitry determines entropy index values of the data unit for each of the patterns of entities. The memory logic circuitry may calculate entropy index values based on probabilities that random data will exhibit the corresponding pattern of entities. In such embodiments, the memory logic circuitry compares the entropy index values against an entropy threshold value. The entropy threshold value may represent a level of security such as a 24-bit security level, a 48-bit security level, a 64-bit security level, a 128-bit security level, a 256-bit security level, and the like. If a data unit includes patterns of entities associated with an entropy index value greater than an entropy threshold value for 64-bit security, for instance, the memory logic circuitry can implement implicit integrity operations that provide 64-bit security for data integrity for that data unit without calculation and storage of a MAC or ICV.

In several embodiments, the memory logic circuitry determines the maximum entropy index value amongst the entropy index values determined for each of the patterns of entities and compares the maximum entropy index value against the entropy threshold value. In such embodiments, if at least one of the patterns of entities has an entropy index value that is greater than the entropy threshold value, the memory logic circuitry can maintain data integrity with the level of security associated with the entropy threshold value.

In some embodiments, the memory logic circuitry may implement implicit integrity operations on data units that involve encoding the data units for storage in memory or decoding data units for processing. In further embodiments, the memory logic circuitry may check data stored in memory to determine if the data is encrypted for detection of malware operations such as ransomware operations or the like.

The memory logic circuitry may perform the pattern checks to determine if a data unit is compatible with implicit integrity operations and to determine an entropy index value associated with the data unit. For example, if the data unit is random data and the pattern check logic cannot detect a pattern of entities that exceeds a threshold value for the pattern check, the data unit is not compatible with the implicit integrity operations. On the other hand, if the data unit exhibits a pattern that the pattern check logic can detect and that exceeds a threshold value, the data unit is compatible with the implicit integrity operations. In many embodiments, the pattern check logic determines a count of the one or more entities of a pattern to compare against the threshold value and the threshold value is indicative of the level of security required for the implicit integrity operations.

After determining that the data unit is compatible with the implicit integrity operations, the memory logic circuitry may encode the data unit with a tag to create an encoded data unit. In some embodiments, the memory logic circuitry may embed the tag in the encoded data unit without expanding the size of the data unit. In other words, the encoded data unit with the embedded tag is the same size or same number of bits as the data unit. In such embodiments, the entropy index values and entropy threshold value indicate numbers of bits and the memory logic circuitry can embed the tag without message expansion if the size of the tag is not longer than the entropy index value of the data unit minus the entropy threshold value. Furthermore, the memory logic circuitry can embed a tag having a size that is up to the entropy index value of the data unit minus the entropy threshold value and still maintain the security level associated with the entropy threshold value.

Many embodiments comprise memory logic circuitry to decode an encoded data unit. In several embodiments, the memory logic circuitry decrypts the encoded data unit to determine a data unit and a tag that is embedded with the data unit. The tag can be any data. In some embodiments, the tag is an error correction code to correct a second encoded data unit.

The memory logic circuitry may receive an encoded data unit from memory and begin to decrypt the encoded data unit. The decryption process may produce a set of data unit and tag pairs. In other words, there is a finite set of solutions to the decryption process in the form of pairs of data units and tags. After determining the set of pairs, the memory logic circuitry may identify the correct, decoded data unit and tag pair. Identifying the correct data unit and tag pair may involve performing a pattern check to detect repetitions of entities in each of the data units in the set of pairs, determining an entropy index value for each of the data units, identifying the highest entropy index value, and comparing the highest entropy index value against the entropy threshold value. If the highest entropy index value is greater than the entropy threshold value, the pair associated with the highest entropy index value is the correct data unit and tag to decrypt from the encoded data unit.

It should be understood that the terms "high" or "low" or "higher" or "lower" when used to refer to the entropy or entropy index of a data unit are defined with respect to a specific measure used to quantify the entropy for the data unit. As discussed herein, the "entropy" refers to the statistical entropy measure that is commonly used in the fields of thermodynamics and information theory, so the data unit has a "high" or "higher" entropy when the data unit is not distinguishable or is less distinguishable from random data and the data unit has a "low" or lower" entropy when the data unit is distinguishable or is more distinguishable from random data. Conversely, the entropy measure used in implicit integrity computations is an "entropy index". As defined herein, the entropy index value is "high" or "higher" when the data unit is distinguishable or is more distinguishable from random data and the entropy index value is "low" or "lower" when the data unit is not distinguishable or is less distinguishable from random data. Note also that while some embodiments define the entropy index value to be low for random data and high for data that is not random, some embodiments may define an entropy index value to be high for random data and low for data that is not random. In such embodiments, calculations and decisions are modified accordingly to generate the same results.

In some embodiments, if the highest entropy index value is not greater than the entropy threshold value, the encoded data unit is corrupted. If the memory logic circuitry determines that the encoded data unit might be corrupted, the memory logic circuitry may implement corrective measures to repair the encoded data unit. For example, the memory logic circuitry may perform a parity check, error correction with a tag embedded in a previously decrypted data unit, a check sum, a brute-force algorithm to change one or more bits at a time, or the like. Once the memory logic circuitry corrects the encoded data unit or attempts to correct the encoded data unit, the memory logic circuitry may decrypt the encoded data unit to determine a set of data unit and tag pairs, determine entropy index values for each of the data units, and compare the entropy index values to the entropy threshold value to determine the correct data unit and tag pair.

In further embodiments, if the highest entropy index value is not greater than the entropy threshold value, the encoded data unit might be encrypted with a MAC or ICV so the memory logic circuitry may search for an associated MAC or ICV to check the validity of the encoded data unit. If an associated MAC or ICV is not found, the memory logic circuitry may identify the encoded data unit as corrupted or attempt to perform corrective measures.

Various embodiments may be designed to address different technical problems associated with data integrity. Other technical problems may include producing, storing, and verifying mathematical summaries of data units for data integrity; generating a message authentication code (MAC) or integrity check value, and storing the MAC or ICV in conjunction with an encoded data unit to support data integrity; performing cryptographic hash functions such as SHA256 or SHA3 to generate a MAC or ICV; reading the MAC or ICV in conjunction with the encoded data unit to support data integrity calculations; performing multiple store operations to store the encoded data unit and the MAC or ICV; performing multiple read operations to read the encoded data unit and the MAC or ICV; performing computationally intense cryptographic has operations; storing a greater amount of data than the data unit to store the encoded data unit and the MAC or ICV; and/or the like.

Different technical problems such as those discussed above may be addressed by one or more different embodiments. For instance, some embodiments that address problems associated with data security may do so by one or more different technical means, such as, performing implicit integrity operations on data stored in main memory, cache, flash, data storage, or any other memory; performing more than one pattern check to determine repetitions of entities within the data; determining entropy index values and/or Boolean values and/or comparing the results to threshold values to determine if a data unit is valid; merging a tag with the data unit without expanding the data unit to create an encoded data unit; decoding and processing the encoded data unit to determine the data unit and the tag; determining value histograms for two or more entities, determining a sum of repetitions of the two or more entities, and comparing the sum to a threshold value; determining that a data unit is valid and/or if the data unit is corrupted; performing corrective measures to correct a corrupted, encoded data unit; and the like.

Several embodiments comprise systems with multiple processor cores such as central servers, servers, workstations, notebooks, netbooks, laptops, and other mobile devices (Smart Phones, Tablets, and the like), other personal computers (PCs), and other server computers. Other embodiments comprise systems such as access points, and/or stations (STAs) such as modems, routers, switches sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Turning now to the drawings, FIG. 1A illustrates an embodiment of a system 1000. The system 1000 is a computer system such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments are implemented as, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 1000 may have a single processor with one core or more than one processor. Note that the term "processor" refers to a processor with a single core or a processor package with multiple processor cores.

As shown in FIG. 1A, the system 1000 comprises a motherboard 1005 for mounting platform components. The motherboard 1005 is a point-to-point interconnect platform that includes a first processor 1010 and a second processor 1030 coupled via a point-to-point interconnect 1056 such as an Ultra Path Interconnect (UPI). In other embodiments, the system 1000 may be of another bus architecture, such as a multi-drop bus. Furthermore, each of processors 1010 and 1030 may be processor packages with multiple processor cores including processor core(s) 1020 and 1040, respectively. While the system 1000 is an example of a two-socket (2S) platform, other embodiments may include more than two sockets or one socket. For example, some embodiments may include a four-socket (4S) platform or an eight-socket (8S) platform. Each socket is a mount for a processor and may be associated with a socket identifier. Note that the term platform refers to the motherboard 1005 with certain components mounted such as the processors 1010 and 1030 and the chipset 1060. Some platforms may include additional components and some platforms may only include sockets to mount the processors and/or the chipset.

The first processor 1010 includes an integrated memory controller (IMC) 1014 and point-to-point (P-P) interfaces 1018 and 1052. Similarly, the second processor 1030 includes an IMC 1034 and P-P interfaces 1038 and 1054. The IMC's 1014 and 1034 couple the processors 1010 and 1030, respectively, to respective memories, a memory 1012 and a memory 1032. The memories 1012 and 1032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 1012 and 1032 are locally attached to the respective processors 1010 and 1030. In other embodiments, the main memory may couple with the processors via a bus and shared memory hub.

In the present embodiment, the IMCs 1014 and 1034 include memory logic circuitry 1015 and 1035. The memory logic circuitry 1015 and 1035 may provide implicit integrity operations to encode data units to store in the memory 1012 and 1032 and to decode encoded data units retrieved from the memory 1012 and 1032. For instance, the memory logic circuitry 1015 and 1035 may provide a level of security for data units that the IMCs 1014 and 1034 store and retrieve from the memories 1012 and 1032 without producing, storing, retrieving, or verifying mathematical summaries of the content such as MACs. In some embodiments, the implicit integrity operations are realized in the form of code to execute on a processor such as the processor 1010 and/or the processor 1030 and the memory logic circuitry comprises the code, the circuitry of memory to store the code as well as the circuitry within and/or outside of the processor(s) supporting implicit integrity operations by execution of the processor instructions of the code. In such embodiments, a machine-readable medium such as cache within and/or outside of the processors, a flash storage 1067, the memories 1012 and 1032, and/or a data storage 1088 stores the code or a portion of the code.

The processors 1010 and 1030 comprise caches coupled with each of the processor core(s) 1020 and 1040, respectively. In the present embodiment, the processor core(s) 1020 and 1040 include memory logic circuitry 1026 and 1046, respectively. The memory logic circuitry 1026 and 1046 may operate in conjunction with or independently of other memory logic circuitry in the system 1000 such as the memory logic circuitry 1015, 1035, 1061, and 1096 and may provide implicit integrity operations to encode data units to store in the memory such as the main memory 1012 and 1032, respectively, flash storage 1067 coupled with the chipset 1060, and/or data storage 1088 coupled with the bus 1091. The memory logic circuitry 1026 and 1046 may provide implicit integrity operations to encode data units to store in memory and to decode encoded data units retrieved from the memory. In some embodiments, the memory logic circuitry may reside in other locations in the system 1000 such as the memory logic circuitry 1061 in the chipset 1060, the memory logic circuitry 1096 in the data storage 1088, or any other location within the system 1000 or outside of but coupled with the system 1000 that can store code for execution by the processor core(s) 1020 and 1040 and/or contain circuitry to implement implicit integrity operations.

In some embodiments, the memory logic circuitry 1015, 1035, 1061, and/or 1096 may operate in conjunction with the memory logic circuitry 1026 and 1046 to perform the implicit integrity operations. For instance, the memory logic circuitry 1015 in the IMC 1014 may implement all the implicit integrity operations for the memory 1012, the memory logic circuitry 1026 in the processor core(s) 1020 may implement all the implicit integrity operations for the memory 1012, or both the IMC 1015 and the processor core(s) 1020 may partially implement the implicit memory operations for the memory 1012 via the memory logic circuitry 1015 and 1026.

In some embodiments, the processor core(s) 1020 may perform implicit integrity operations such as pattern checks, threshold comparisons, entropy determinations, entropy comparisons, encoding, and/or decoding, in registers such as the registers 1016. In further embodiments, the logic circuits within the memory logic circuitry 1015 may perform implicit integrity operations such as pattern checks, threshold comparisons, entropy determinations, entropy comparisons, encoding, and/or decoding.

The memory logic circuitry 1026 and 1046 may represent circuitry configured to implement the implicit integrity operations or may represent a combination of the circuitry within a processor and a medium to store code to implement all or part of the functionality of the implicit integrity operations within memory such as cache, the memory 1012, buffers, or registers such as the registers 1016 within the processor 1010, or within an instruction pipeline of the processor 1010.

In several embodiments, the memory logic circuitry 1096 in the data storage 1088 may perform implicit integrity operations for data units stored in the data storage 1088 independently from the other memory logic circuitry in the system 1000 or in conjunction with the memory logic circuitry of the chip set 1060 and/or one or more of the processors 1010 and 1030.

Figure 1B:
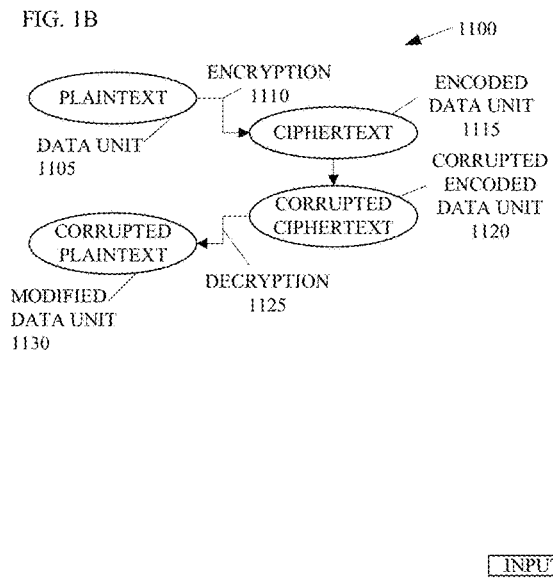
FIG. 1B depicts an embodiment of a state diagram to illustrate states of a data unit including states of an altered data unit.

Referring now to FIGS. 1A and 1B, FIG. 1B illustrates an embodiment of a state diagram 1100 for a data unit 1105 to illustrate different states of the data unit 1105, where the content of the data unit is modified maliciously by an attacker or corrupted by physical means. The memory logic circuitry 1015, 1026, 1035, 1046, 1061, and/or 1096 may implement implicit integrity operations to detect the alteration of the content. The IMC such as the IMC 1014 may receive the data unit 1105 to store in the memory 1012. The memory logic circuitry 1015 may test the data unit 1105 to determine if the data unit 1105 is compatible with the implicit integrity operations. In general, the implicit integrity operations rely on a capability to distinguish the data unit 1105 from random data. The level of entropy refers to the level of randomness of the data unit as discussed herein. If the data unit 1105 is a random data, which means that the data unit has a high level of entropy, the data unit 1105 may not be compatible with implicit integrity operations without introduction of an encoding process to modify the randomness. If the data unit 1105 is not random data, the data unit may have a low level of entropy and the data unit 1105 may be compatible with implicit integrity operations.

At the plaintext state, the data unit 1105 is not random data but has one or more identifiable patterns. The patterns may be a repetition of entities within the data unit 1105. The entities are combinations or two or more bits such as nibbles, bytes, words, double-words, or combinations thereof. In many embodiments, the memory logic circuitry 1015, 1026, 1035, 1046, 1061, and/or 1096 may perform a pattern check to detect the one or more patterns to determine if the data unit 1105 is compatible with implicit integrity operations. In some embodiments, if the data unit 1105 is not compatible with implicit integrity operations, the memory logic circuitry 1015, 1026, 1035, 1046, 1061, and/or 1096 may utilize cryptographic hashes with MACs or ICVs to provide data integrity.

Once the memory logic circuitry 1015, 1026, 1035, 1046, 1061, and/or 1096 verifies that the data unit 1105 is low entropy, the memory logic circuitry 1015, 1026, 1035, 1046, 1061, and/or 1096 may encrypt 1110 the data unit 1105 to create an encoded data unit 1115. Ciphertext refers to the state of the encoded data unit 1115. At the ciphertext state, the encoded data unit 1115 has a high entropy so the one or more identifiable patterns are not identifiable in this state.

The encryption algorithm may approximate a random oracle with, e.g., one or more cryptographic hash functions. A random oracle is an oracle that responds to every unique query with a random response chosen uniformly from its output domain. If a query is repeated, the random oracle responds with the same output every time. In many embodiments, the random oracle is a mathematical function chosen uniformly at random that maps each possible query to a fixed random response from its output domain.

If the encoded data unit 1115 becomes corrupted, which creates the corrupted encoded data unit 1120, the state of the data unit shifts to a corrupted ciphertext. At the corrupted ciphertext state, the corrupted encoded data unit 1120 also has a high entropy. Then, when the memory logic circuitry 1015, 1026, 1035, 1046, 1061, and/or 1096 attempts to decrypt 1125 the corrupted encoded data unit 1120, the decryption operation 1125 creates a modified data unit 1130 in the corrupted plaintext state.

Any corruption on the cipher text results in a new cipher text value, which is different from the original one and any decryption operation on this new cipher text value results in a corrupted plaintext value which is different from the original one. As decryption is the inverse operation of encryption, the decryption algorithm also approximates a random oracle. Thus, the corrupted plaintext value is also indistinguishable from random data. The corrupted plaintext is indistinguishable from random data due to an 'avalanche effect' associated with the decryption oracle. Even a single bit change in the cipher text affects all bits of the decrypted plaintext. For these reasons, checking the entropy of the result of a decryption operation can be a reliable test for detecting corruption, which is an 'implicit integrity' operation.

The memory logic circuitry 1015, 1026, 1035, 1046, 1061, and/or 1096 may determine that the encoded data unit 1115 became corrupted in response to the decryption operation 1125 producing a modified data unit 1130 with a high entropy. The memory logic circuitry 1015, 1026, 1035, 1046, 1061, and/or 1096 may determine that the modified data unit 1130 has a high entropy by performing a pattern check and determining that the modified data unit 1130 is not distinguishable from random data via one or more threshold values or an entropy threshold value.

Once the memory logic circuitry 1015, 1026, 1035, 1046, 1061, and/or 1096 determines that the modified data unit 1130 has a high entropy, the memory logic circuitry 1015, 1026, 1035, 1046, 1061, and/or 1096 may perform corrective measures on the corrupted encoded data unit 1120, identify the corrupted encoded data unit 1120 as corrupted, and/or perform other data integrity operations.

Figure 1C:
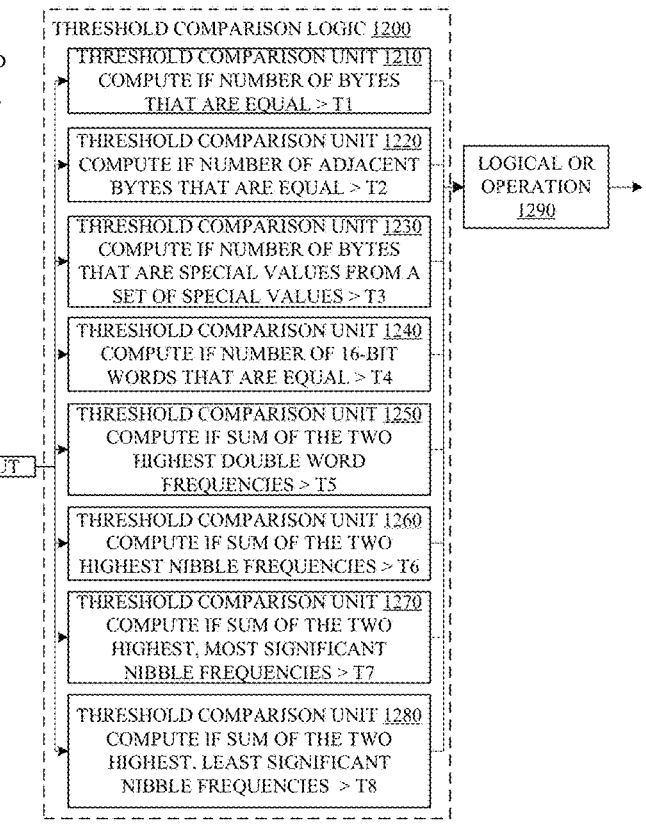

Referring now to FIGS. 1A, 1B, and 1C, FIG. 1C illustrates an embodiment of threshold comparison logic 1200 of the memory logic circuitry 1015, 1026, 1035, 1046, 1061, and/or 1096. The threshold comparison logic 1200 may receive as an input, a data unit 1105, perform one or more pattern checks to quantify the existence of patterns or repetitions of entities within the data unit 1105, and compare the repetitions of entities against one or more thresholds associated with the pattern checks. For instance, the data unit 1105 may be a cache line with 512 bits. The threshold comparison logic 1200 may perform one or more pattern checks that compares a quantity or count of the repetitions of the entities detected against a threshold value, and output an indication such as a true or false, a logical one or zero, or the like to indicate if the count of the repetitions of entities exceeds the threshold value for the pattern check.

In present embodiment, threshold comparison logic 1200 comprises multiple threshold comparison units 1210 through 1290, each threshold comparison unit outputs a Boolean value associated with a different pattern check indicating whether the count of repeating entities associated with the pattern check exceeds the threshold associated with the pattern check. In these embodiments, threshold comparison logic 1200 performs a logical OR operation 1290 on the outputs of one or more of the threshold comparison unit output values to determine if any of the threshold comparison units output an indication that the count of repetitions of the entities for the pattern check exceeds the corresponding threshold value. In several embodiments, the logic or circuitry of one or more or all the threshold comparison unit(s) can determine if the count of repetitions of entities corresponding to a pattern check exceeds a threshold value without calculating the count. In other words, the logic or circuitry can directly calculate, from the data unit received as the input, an output to indicate if the count of repetitions of a pattern of entities in the data unit exceeds the threshold without rigidly performing two sequential steps of determining the count and then comparing the count to a threshold value.

In the present embodiment, the threshold comparison logic 1200 includes a specific set of eight threshold comparison units 1210 through 1280, each threshold comparison unit computing an output to indicate if the count of repetitions of entities in accordance with a pattern exceeds a different threshold value, T1 through T8, respectively. Other embodiments may include more of or less of the threshold comparison units. Some embodiments may implement the same pattern checks as in the threshold comparison logic 1200 but other embodiments may implement different pattern checks that compare repetitions of entities in accordance with different patterns.

A first threshold comparison unit 1210 in the threshold comparison logic 1200 computes a value indicative of whether or not a number of bytes in the data unit 1105 that are equal exceeds a first threshold value, T1. In many embodiments, the first threshold comparison unit 1210 computes the value directly from the input, the data unit 1105. In further embodiments, the first threshold comparison unit 1210 may compare each byte of the data unit 1105 with each of the other bytes, determine a count of the number of bytes that are equal, compare the count to the first threshold value, T1, and output an indication such as a true or false or a logical one or zero, to indicate if the count exceeds the first threshold value, T1. In some embodiments, the first threshold comparison unit 1210 may compute a value to output that is representative of a comparison of the largest count or maximum count of the number of bytes that are equal against the first threshold value, T1. In other embodiments, the first threshold comparison unit 1210 may calculate more than one outputs based on comparisons of the first threshold value against more than one counts of bytes that are equal in the data unit 1105. In further embodiments, the first threshold comparison unit 1210 may output a Boolean value which is equal to TRUE only if the count of bytes that are equal is greater than the first threshold value, T1.

A second threshold comparison unit 1220 in the threshold comparison logic 1200 computes a value indicative of whether or not the number of adjacent or contiguous bytes in the data unit 1105 that are equal exceed a second threshold value, T2. In many embodiments, the second threshold comparison unit 1220 computes the value directly from the input, the data unit 1105. In further embodiments, the second threshold comparison unit 1220 may determine a value indicative of a comparison of each byte of the data unit 1105 with each of the other bytes, determine a count of the number of adjacent or contiguous bytes that are equal, compare the count to the threshold value T2, and output an indication such as a true or false or a logical one or zero, to indicate if the count exceeds the second threshold value, T2. In some embodiments, the second threshold comparison unit 1220 may compute a value to output that is representative of a comparison of the largest count or maximum count of the number of adjacent bytes that are equal against the second threshold value, T2. In other embodiments, the second threshold comparison unit 1220 may calculate more than one outputs based on comparisons of the second threshold value against more than one counts of adjacent bytes that are equal in the data unit 1105. In further embodiments, the second threshold comparison unit 1220 may output a Boolean value which is equal to TRUE only if the count of adjacent bytes that are equal is greater than a fixed value. In even further embodiments, the second threshold comparison unit 1220 may determine the largest count or maximum count of the number of adjacent or contiguous 16-bit words that are equal.

A third threshold comparison unit 1230 in the threshold comparison logic 1200 computes a value indicative of whether or not the number of bytes in the data unit 1105 that are equal to special values from a set of one or more special values exceed a third threshold value, T3. In many embodiments, the third threshold comparison unit 1230 computes the value directly from the input, the data unit 1105. The special values may include one or more values that identify a particular type of data that may or may not be easily detected with other pattern checks. In one embodiment, the set of special values comprises two values: 0x00 and 0xFF. The "0x" identifies these numbers "00" and "FF" as being in the hexadecimal format. In other embodiments, the set of special values may include more values or may include only one value. In several embodiments, the special values may include or may not include the values: 0x00 and 0xFF In further embodiments, the third threshold comparison unit 1230 may compare each byte of the data unit 1105 with one or more special values to determine how many of the special values are in the data unit 1105, compare the count to the threshold value T3, and output an indication such as a true or false or a logical one or zero, to indicate if the count exceeds the third threshold value, T3. In several embodiments, the third threshold comparison unit 1230 may compute a value to output that is representative of a comparison of a count that is a sum of all bytes that are equal to any of the special values in the set of special values against the third threshold value, T3. In other embodiments, the third threshold comparison unit 1230 may calculate more than one outputs based on comparisons of the third threshold value against a count for each of the special values in the set of special values. In one embodiment, the third threshold comparison unit 1230 may compute a value to output that is representative of a comparison of the largest or maximum count of each of the special values for the data unit 1105. In further embodiments, the third threshold comparison unit 1230 may output a Boolean value which is equal to TRUE only if the count of bytes taking special values is greater than a fixed value.

A fourth threshold comparison unit 1240 in the threshold comparison logic 1200 computes a value indicative of whether or not the number of 16-bit words that are equal to each other in the data unit 1105 exceed a fourth threshold value, T4. In many embodiments, the fourth threshold comparison unit 1240 computes the value directly from the input, the data unit 1105. In further embodiments, the fourth threshold comparison unit 1240 determines a count of words that have the same value in the data unit 1105, compares the count to the threshold value T4, and outputs an indication such as a true or false or a logical one or zero, to indicate if the count exceeds the fourth threshold value, T4. In some embodiments, the fourth threshold comparison unit 1240 may compute a value to output that is representative of a comparison of the largest count or maximum count of a number of 16-bit words that are equal against the fourth threshold value, T4. In other embodiments, the fourth threshold comparison unit 1240 may calculate more than one outputs based on comparisons of the fourth threshold value against more than one count of 16-bit words that are equal in the data unit 1105. In further embodiments, the fourth threshold comparison unit 1240 may output a Boolean value which is equal to TRUE only if the count of 16-bit words that are equal is greater than the fourth threshold value.

A fifth threshold comparison unit 1250 in the threshold comparison logic 1200 computes a value indicative of whether or not a sum of the two-highest double-word frequencies in the data unit 1105 exceeds a fifth threshold value, T5. In many embodiments, the fifth threshold comparison unit 1250 computes the value directly from the input, the data unit 1105. In further embodiments, the fifth threshold comparison unit 1250 determines the frequency or count of each double-word in the data unit 1105, determines which two double-words have the highest counts, or repetitions, adds the counts of the two different double-words in the data unit 1105 that have the highest counts, compares the sum to the threshold value T5, and outputs an indication such as a true or false or a logical one or zero, to indicate if the sum exceeds the fifth threshold value, T5. For instance, the fifth threshold comparison unit 1250 may compare each double-word of the data unit 1105 with each of the other double-words in the data unit 1105, determine a sum of all the repetitions of each different double-word in the data unit, add the two highest sums, and compare a sum of the two highest sums against the fifth threshold value, T5, to determine the output. In other embodiments, the fifth threshold comparison unit 1250 may output a comparison of the fifth threshold value against the sum of the three highest sums, the sum of the four highest sums, and/or the sum of the N the highest sums, wherein N is a positive number or integer. In further embodiments, the fifth threshold comparison unit 1250 may output a Boolean value which is equal to TRUE only if the sum of the two highest sums is greater than the fifth threshold value, T5.

A sixth threshold comparison unit 1260 in the threshold comparison logic 1200 computes a value indicative of whether or not a sum of the two highest nibble frequencies in the data unit 1105 exceeds a sixth threshold value, T6. In many embodiments, the sixth threshold comparison unit 1260 computes the value directly from the input, the data unit 1105.

In further embodiments, the sixth threshold comparison unit 1260 determines the frequency or count of each nibble in the data unit 1105, determines which two nibbles have the highest counts, or repetitions, adds the counts of the two different nibbles in the data unit 1105 that have the highest counts, compares the sum of the counts to the threshold value T6, and outputs an indication such as a true or false or a logical one or zero, to indicate if the sum exceeds the sixth threshold value, T6. For instance, the sixth threshold comparison unit 1260 may compare each nibble of the data unit 1105 with each of the other nibbles in the data unit 1105, determine a sum of all the repetitions of each different nibble in the data unit, add the two highest sums, and compare a sum of the two highest sums against the sixth threshold value, T6.

In other embodiments, the sixth threshold comparison unit 1260 may calculate more than one outputs based on comparisons of the sixth threshold value against the sum of the three highest sums, the sum of the four highest sums, and/or sum of the N the highest sums, wherein N is a positive number or integer. In further embodiments, the sixth threshold comparison unit 1260 may output a Boolean value which is equal to TRUE only if the sum of the two highest sums is greater than the sixth threshold value, T6.

A seventh threshold comparison unit 1270 in the threshold comparison logic 1200 computes a value indicative of whether or not a sum of the two highest, most significant nibble frequencies in the data unit 1105 exceeds a seventh threshold value, T7. The data unit 1105 may comprise, for example, 16, 32, or 64 bytes. Each byte comprises a most significant nibble and a least significant nibble. In many embodiments, the seventh threshold comparison unit 1270 computes the value directly from the input, the data unit 1105.

In further embodiments, the seventh threshold comparison unit 1270 may determine the frequency or count of each most significant nibble in the data unit 1105, determine which two most significant nibbles have the highest counts, or repetitions, add the counts of the two different, most significant nibbles in the data unit 1105 that have the highest counts, compare the sum of the counts to the threshold value T7, and output an indication such as a true or false or a logical one or zero, to indicate if the sum exceeds the seventh threshold value, T7. For instance, the seventh threshold comparison unit 1270 may compare each most significant nibble of the data unit 1105 with each of the other most significant nibbles in the data unit 1105; determine a sum of all the repetitions of each different, most significant nibble in the data unit; add the two highest sums; and compare a sum of the two highest sums against the seventh threshold value, T7. In other embodiments, the seventh threshold comparison unit 1270 may calculate more than one outputs based on comparisons of the seventh threshold value against the sum of the three highest sums, the sum of the four highest sums, and/or the sum of the N highest sums. In further embodiments, the seventh threshold comparison unit 1270 may output a Boolean value which is equal to TRUE only if the sum of the two highest sums is greater than seventh threshold value, T7.

An eighth threshold comparison unit 1280 in the threshold comparison logic 1200 computes a value indicative of whether or not a sum of the two highest, least significant nibble frequencies in the data unit 1105 exceeds an eighth threshold value, T8. The data unit 1105 may comprise, for example, 16, 32, or 64 bytes. Each byte comprises a most significant nibble and a least significant nibble. In many embodiments, the eighth threshold comparison unit 1280 computes the value directly from the input, the data unit 1105.

In further embodiments, the eighth threshold comparison unit 1280 may determine the frequency or count of each least significant nibble in the data unit 1105, determine which two least significant nibbles have the highest counts, or repetitions, add the counts of the two different, least significant nibbles in the data unit 1105 that have the highest counts, compare the count to the threshold value T8, and output an indication such as a true or false or a logical one or zero, to indicate if the count exceeds the eighth threshold value, T8. For instance, the eighth threshold comparison unit 1280 may compare each least significant nibble of the data unit 1105 with each of the other least significant nibbles in the data unit 1105; determine a sum or count of all the repetitions of each different, least significant nibble in the data unit 1105; add the two highest sums or counts; and output a comparison of a sum of the two highest sums or counts against the eighth threshold value, T8. In other embodiments, the eighth threshold comparison unit 1280 may calculate more than one outputs based on comparisons of the eighth threshold value against the sum of the three highest sums or counts, the sum of the four highest sums or counts, and/or the sum of more than four of the highest sums or counts. In further embodiments, the eighth threshold comparison unit 1280 may output a Boolean value which is equal to TRUE only if the sum of the two highest sums is greater than the eighth threshold value, T8.

The outputs of the threshold comparison logic 1200 may include one or more of the outputs from the threshold comparison units 1210 through 1280 and may serve as inputs to the logical OR operation 1290. The logical OR operation 1290 may determine if the data unit 1105 passes by determining if any one of the threshold comparison units 1210 through 1280 output a value such as TRUE or a logical one that indicates that the count or sum of counts of repetitions of the entities exceeds the corresponding threshold value. In other embodiments, the data unit 1105 may pass if more than one of the threshold comparison units 1210 through 1280 indicates that the sum or count exceeds the corresponding threshold value. In further embodiments, the data unit 1105 may pass if more than one of the threshold comparison units 1210 through 1280 indicates that the sum or count is equal to or greater than the corresponding threshold value.

Referring now to FIGS. 1A, 1B, and 1D, FIG. 1D illustrates an embodiment of pattern check logic 1300 of the memory logic circuitry 1015, 1026, 1035, 1046, 1061, and/or 1096. The pattern check logic 1300 may receive as an input, a data unit 1105 and quantify the existence of patterns or repetitions of entities within the data unit 1105. For instance, the data unit 1105 may be a cache line with 512 bits. The pattern check logic 1300 may perform one or more pattern checks and output a value for each pattern check indicating a quantity or count of the repetitions detected of the pattern associated with the pattern check. In many embodiments, pattern check logic 1300 outputs the numbers of repeating quantities to an entropy determination logic 1390 such as the entropy determination logic 1400 in FIG. 1E.

While the pattern check logic 1300 includes a specific set of eight pattern check units 1310 through 1380, other embodiments may include more or less of the pattern checks. Some embodiments may implement the same pattern checks but other embodiments may implement different pattern checks that quantify repetitions of different patterns. In other embodiments, the pattern checks of logic 1300 may involve different data units from the data units of FIG. 1B.

A first pattern check unit 1310 in the pattern check logic 1300 computes a value indicative of a number of bytes in the data unit 1105 that are equal. For instance, the first pattern check unit 1310 may compare each byte of the data unit 1105 with each of the other bytes and output a count of the number of bytes that are equal. In some embodiments, the first pattern check unit 1310 may determine the largest count or maximum count of the number of bytes that are equal. In other embodiments, the first pattern check unit 1310 may output more than one count of bytes that are equal in the data unit 1105.

A second pattern check unit 1320 in the pattern check logic 1300 computes a value indicative of the number of adjacent or contiguous bytes in the data unit 1105 that are equal. For instance, the second pattern check unit 1320 may compare each byte of the data unit 1105 with each of the other bytes and output a count of the number of adjacent or contiguous bytes that are equal. In some embodiments, the second pattern check unit 1320 may determine the largest count or maximum count of the number of adjacent or contiguous bytes that are equal. In other embodiments, the second pattern check 1320 may output more than one count of adjacent or contiguous bytes that are equal in the data unit 1105. In further embodiments, the second pattern check unit 1320 may determine the largest count or maximum count of the number of adjacent or contiguous 16-bit words that are equal.

A third pattern check unit 1330 in the pattern check logic 1300 computes a value indicative of the number of bytes in the data unit 1105 that are equal to special values from a set of one or more special values. The special values may include one or more values that identify a particular type of data that may or may not be easily detected with other pattern checks. For instance, the third pattern check unit 1330 may compare each byte of the data unit 1105 with one or more special values to determine how many of the special values are in the data unit 1105. In one embodiment, the set of special values comprises two values: 0x00 and 0xFF. In other embodiments, the set of special values may include more values or may include only one value. In several embodiments, the special values may include or may not include the values: 0x00 and 0xFF.

In several embodiments, the third pattern check unit 1330 may determine a count that is a sum of all bytes that are equal to any of the special values in the set of special values. In other embodiments, the third pattern check unit 1330 may determine a count for each of the special values in the set of special values and may output each of the counts. In one embodiment, the third pattern check unit 1330 may determine a count of each of the special values and output the largest or maximum count for the data unit 1105.

A fourth pattern check unit 1340 in the pattern check logic 1300 computes the number of 16-bit words that are equal to each other in the data unit 1105. In other words, the fourth pattern check unit 1340 determines a count of words that have the same value in the data unit 11051313 In some embodiments, the fourth pattern check unit 1340 may determine the largest count or maximum count of the number of 16-bit words that are equal. In other embodiments, the fourth pattern check unit 1340 may output more than one count of 16-bit words that are equal in the data unit 1105.

A fifth pattern check unit 1350 in the pattern check logic 1300 computes a sum of the two-highest double-word frequencies in the data unit 1105. In other words, the fifth pattern check unit 1350 determines the frequency or count of each double-word in the data unit 1105, determines which two double-words have the highest counts, or repetitions, and then adds the counts of the two different double-words in the data unit 1105 that have the highest counts. For instance, the fifth pattern check unit 1350 may compare each double-word of the data unit 1105 with each of the other double-words in the data unit 1105, determine a sum of all the repetitions of each different double-word in the data unit, add the two highest sums, and output a sum of the two highest sums. In other embodiments, the fifth pattern check unit 1350 may output the sum of the three highest sums, of the four highest sums, and/or of more than four of the highest sums.

A sixth pattern check unit 1360 in the pattern check logic 1300 computes a sum of the two highest nibble frequencies in the data unit 1105. In other words, the sixth pattern check unit 1360 determines the frequency or count of each nibble in the data unit 1105, determines which two nibbles have the highest counts, or repetitions, and then adds the counts of the two different nibbles in the data unit 1105 that have the highest counts. For instance, the sixth pattern check unit 1360 may compare each nibble of the data unit 1105 with each of the other nibbles in the data unit 1105, determine a sum of all the repetitions of each different nibble in the data unit, add the two highest sums, and output a sum of the two highest sums. In other embodiments, the sixth pattern check unit 1360 may output the sum of the three highest sums, of the four highest sums, and/or of more than four of the highest sums.

FIG. 1H illustrates an example of logic circuitry 1700 in the pattern check logic 1300 for the sixth pattern check unit 1360. The logic circuitry 1700 may extract each nibble 1 through N 1710 of the data unit 1105 to input into decoders 1 through N 1720.

Each decoder 1 through N 1720 may decode the nibble to determine which output of the decoder represents the nibble. For example, a nibble has four bits so the decoder 1 has 16 outputs, represented but lines 0 through 15. Each line 0 through 15 represents a different nibble. The decoder 1 determines which line corresponds to the nibble 1 and outputs a one-bit at that line. In some embodiments, the output at line 0 corresponds to a nibble of "0000", the output at line 1 corresponds to a nibble of "0001", and so on through the output at line 15, which corresponds to a nibble of "1111". If the nibble 1 is "0001", the decoder 1 may output a zero-bit at line 0, and a one-bit at line 1 followed by a series of zero-bits at lines 2 through 15. In other embodiments, the decoders 1 through N may output a zero-bit at the line corresponding to the nibble and one-bits at each of the lines that do not match the nibble.

After the decoders 1 through N output lines 0 through 15 with bits representative of each of the nibbles 1 through N, the logic circuitry 1700 determines the sum of the matches 1730. In the present embodiment, there are 16 different summation outputs from this stage. These outputs constitute the histogram of nibble values produced from the input data. For example, in the case where the data unit 1105 is a cache line, the logic circuitry passes 128 nibbles into 128 decoder circuits to create histograms. The logic circuitry passes histograms to a tree of comparators which computes the two highest values from this histogram and sums the two highest values to generate an output.

For embodiments in which the decoders 1 through N output one-bits for matches, the sum of all "0" lines from the decoders 1 through N indicate the count of nibbles that are, e.g., "0000"; the sum of all "1" lines from the decoders 1 through N indicate the count of nibbles that are, e.g., "0001"; the sum of all "2" lines from the decoders 1 through N indicate the count of nibbles that are, e.g., "0010"; the sum of all "3" lines from the decoders 1 through N indicate the count of nibbles that are, e.g., "0011"; the sum of all "4" lines from the decoders 1 through N indicate the count of nibbles that are, e.g., "0100"; and so on through the sum of all "15" lines from the decoders 1 through N, which indicate the count of nibbles that are, e.g., "1111". Thereafter, the tree of comparators 1740 may determine the sum of the two highest nibble frequencies.

In some embodiments, the logic circuitry for each of the pattern check units 1310 through 1380 identifies each entity, compares each entity to one or more other entities, and sums the results of the comparisons to determine or calculate an output.

A seventh pattern check unit 1370 in the pattern check logic 1300 computes a sum of the two highest, most significant nibble frequencies in the data unit 1105. The data unit 1105 may comprise, for example, 16, 32, or 64 bytes. Each byte comprises a most significant nibble and a least significant nibble. The seventh pattern check unit 1370 may determine the frequency or count of each most significant nibble in the data unit 1105, determine which two most significant nibbles have the highest counts, or repetitions, and add the counts of the two different, most significant nibbles in the data unit 1105 that have the highest counts. For instance, the seventh pattern check unit 1370 may compare each most significant nibble of the data unit 1105 with each of the other most significant nibbles in the data unit 1105; determine a sum of all the repetitions of each different, most significant nibble in the data unit; add the two highest sums; and output a sum of the two highest sums. In other embodiments, the seventh pattern check unit 1370 may output the sum of the three highest sums, of the four highest sums, and/or of more than four of the highest sums.

An eighth pattern check unit 1380 in the pattern check logic 1300 computes a sum of the two highest, least significant nibble frequencies in the data unit 1105. The data unit 1105 may comprise, for example, 16, 32, or 64 bytes. Each byte comprises a most significant nibble and a least significant nibble. The eighth pattern check unit 1380 may determine the frequency or count of each least significant nibble in the data unit 1105, determine which two least significant nibbles have the highest counts, or repetitions, and add the counts of the two different, least significant nibbles in the data unit 1105 that have the highest counts. For instance, the eighth pattern check unit 1380 may compare each least significant nibble of the data unit 1105 with each of the other least significant nibbles in the data unit 1105; determine a sum of all the repetitions of each different, least significant nibble in the data unit 1105; add the two highest sums; and output a sum of the two highest sums. In other embodiments, the eighth pattern check unit 1380 may output the sum of the three highest sums, of the four highest sums, and/or of more than four of the highest sums.

The outputs of the pattern check logic 1300 may include one or more of the outputs from the pattern check units 1310 through 1380 and may serve as inputs to the entropy determination logic 1390 such as the entropy determination logic 1400 illustrated in FIG. 1E.

Referring now to FIGS. 1A, 1C and 1E, FIG. 1E illustrates an embodiment of the entropy determination logic 1400 of the memory logic circuitry 1015, 1026, 1035, 1046, 1061, and/or 1096. The entropy determination logic 1400 may receive one or more outputs from the pattern check logic 1300, calculate entropy index values for each of the one or more outputs based on probabilities that repetitions of entities occur in random data, and determine if one or more or any of the entropy index values implicitly indicate that the data unit 1105 is distinguishable random data (low entropy) or is not distinguishable from random data (high entropy). For instance, for pattern check logic with eight outputs such as the pattern check logic 1200, the entropy determination logic 1400 may calculate eight entropy index values and compare the entropy index values to an entropy threshold value to determine if any of the entropy index values are equal to or exceed the entropy threshold value. In one embodiment, the entropy determination logic 1400 may calculate eight entropy index values, determine the maximum entropy index value of all the entropy index values, and compare the maximum entropy index value to the entropy threshold value to determine if any of the entropy index values are equal to or exceed the entropy threshold value.

In many embodiments, the entropy determination logic 1400 compares all the entropy index values to a single entropy threshold value. This entropy threshold value represents the expected (or probable) number of efforts required by an adversary to produce at least one of the patterns considered in the pattern check logic 1200 by corrupting plaintext data. Such probability relates to the highest entropy index value or the maximum entropy index value. A threshold comparison operation unit 1490 compares the highest entropy index value or the maximum entropy index value against the entropy threshold value to determine if at least one pattern check employed by the pattern check logic 1200 identified entities that exhibit a pattern that exceeds the entropy threshold value. If at least one pattern check unit output does convert to an entropy index value that exceeds the entropy threshold value, the data unit 1105 is low entropy, which means that the data unit 1105 is distinguishable from random data. On the other hand, if none of the pattern check units' outputs convert to an entropy index value that exceeds the entropy threshold value, the data unit 1105 is high entropy, which means that the data unit 1105 is not distinguishable from random data.

The entropy determination logic 1400 may comprise a set of one or more entropy determination units to determine entropy index values based on probabilities that a pattern with repetitions of entities occurs in random data. In the present embodiment, the entropy determination logic 1400 comprises a set of eight entropy determination units 1410 through 1480 that determine entropy index values based on the outputs of pattern check units 1210 through 1280, respectively.

The entropy determination logic 1400 may calculate the entropy index values by determining a probability that random data will include or will not include the bit patterns identified by the pattern check logic 1200. For instance, the first entropy determination unit 1410 may receive a count of bytes that are equal from the pattern check unit 1210 and may determine an entropy index value that is the probability that a randomly generated data unit will comprise the count. The threshold comparison operation unit 1490 may then select the rarest of the patterns, which is the one that has the smallest probability among random data and the highest entropy index value, and compare the highest entropy index value against the entropy threshold value The entropy determination logic 1400 may convert the count or number of entities that exhibit a pattern in the data unit 1105 into an entropy index value. To convert the count to an entropy index value, consider a pattern p of type $\pi$ (e.g., maximum number of bytes being equal). If the data unit 1105, x, demonstrates pattern p and exactly N entities from x exhibit this pattern (e.g., the maximum number of bytes being equal is exactly N), we denote this fact as:

$$x \in p(\pi, N)$$

The entropy index value E is related to the pattern type $\pi$ and the entropy index value E is equal to the negative logarithm of the probability that $x \in p(\pi, N)$ given that x is random (e.g., x is output by a random oracle).

$$E(\pi, N) = -\log_2 Pr(x \in p(\pi, N) | x \text{ is random})$$

According to the definition above, the probability of finding the pattern $p(\pi, N)$ in a random data value x is equal to $2^{-E}$. The entropy index value E may be measured in bits. Furthermore, the expected number of random values to inspect until finding one that demonstrates the pattern $p(\pi, N)$ is $2^E$. As a result, the entropy index value E associated a pattern type $\pi$ and an entity number N is also equal to the logarithm of the expected number of random values that we need to inspect until we find one value x such that $x \in p(\pi, N)$.

For example, the pattern check units in the pattern check logic 1200 to determine the number of bytes that are equal or the number of words that are equal are applicable to the protection of memory and storage data because many data units in computing systems contain code or data structures which demonstrate significant byte or word value repetitions. The entropy determination unit 1410 may determine an entropy index value, E1, based on the count output from the pattern check unit 1210. In some embodiments, the entropy determination unit 1410 may determine an entropy index value, E1, associated with the data unit 1105 consisting of n bytes that demonstrates m bytes being equal to each other by the following equation:

$$E1 \cong -\log_2\left(\binom{n}{m}\left(\frac{1}{256}\right)^{m-1} \cdot \left(1 - \frac{1}{256}\right)^{n-m}\right)$$

In further embodiments, an entropy determination unit 1410 may determine an entropy index value, E, associated with the data unit 1105 consisting of n 16-bit words, which demonstrates m words being equal to each other by the following equation:

$$E1 \cong -\log_2\left(\binom{n}{m}\left(\frac{1}{65536}\right)^{m-1} \cdot \left(1 - \frac{1}{65536}\right)^{n-m}\right)$$

For an adversary to successfully attack the byte or the word equality pattern check unit, the adversary needs to produce corrupted plaintext data demonstrating m or more equal byte/word values. In random data, such equalities are observed with probability computed as the birthday collision probability associated n elements, m collisions and 256 (for bytes) or 65536 (for words) birthdays.

$$p^{(birthday-collision-bytes)}(n, m) \cong$$
$$1 - \prod_{i=0}^{n-1} \sum_{j=0}^{m-2} \binom{n-i-1}{j} \cdot \left(\frac{1}{256}\right)^j \cdot \left(\frac{255}{256}\right)^{n-i-j-1}$$

$$p^{(birthday-collision-words)}(n,$$
$$m \cong 1 - \prod_{i=0}^{n-1} \sum_{j=0}^{m-2} \binom{n-i-1}{j} \cdot \left(\frac{1}{65536}\right)^j \cdot \left(\frac{65535}{65536}\right)^{n-i-j-1}$$

These birthday collision probabilities are a little higher than the probability values $2^{-E}$ associated with the entropy index values given above. This is because these birthday collision probabilities include all events where there are more than m values being equal in a data unit. Based on the cumulative entropy index distribution computed over 111 million cache lines for the byte and word equality pattern checks respectively, entropy index values corresponding to reasonably high security levels (e.g., 32 bits, 24 bits) for implicit integrity are associated with high pass rates in regular client data cache lines. For example, for the security level of 32 bits, the percentage of cache lines that demonstrate this entropy index or higher is 85.275% if the byte equality pattern check is used. For the security level of 24 bits, the percentage of cache lines that demonstrate this entropy index value or higher is increased to 91.48%.

The pattern check units that compute the number of bytes that are equal to each other and occupy continuous or contiguous index positions in the pattern check logic 1200 are successful not only on data units that contain code and data structures but also on uninitialized memory entries, where a single arbitrary byte value may be repeating. The entropy determination unit 1420 may compute the entropy index E2 associated with the data unit 1105 consisting of n bytes, which demonstrates m bytes being adjacent and equal to each other by the following equation:

$$E2 \cong -\log_2\left((n-m+1)\left(\frac{1}{256}\right)^{m-1} \cdot \left(1 - \frac{1}{256}\right)^{n-m}\right)$$

For an adversary to successfully attack the adjacent byte equality pattern check unit 1420, the adversary needs to produce corrupted plaintext data demonstrating m or more adjacent equal bytes. In random data, this can happen with probability:

$$p^{(adjacent-equal)}(n, m) \cong \sum_{i=m}^{n} (n-i+1)\left(\frac{1}{256}\right)^{i-1} \cdot \left(1 - \frac{1}{256}\right)^{n-i}$$

which is a little higher than the value $2^{-E}$ associated with the entropy index E, for the same reasons as discussed above. The pass rates associated with this pattern check may not be as high as the pass rates associated with the byte or word equality pattern checks. For entropy index values corresponding to security levels of 32 bits and 24 bits, the percentages of cache lines that demonstrate such or higher entropy indexes are 63.678% and 65.82% respectively, based on a cumulative entropy index distribution for the adjacent byte equality pattern check computed over 111 million cache lines. A benefit from using this pattern check comes from the fact this pattern check can be combined with byte and word equality pattern checks, which demonstrates even higher pass rates for the same client cache lines.

The pattern check unit 1230 that counts the maximum number of bytes that take special values from a set V can successfully characterize code, data structures, and uninitialized memory entries. In our implementation and measurements, we consider, as an example, a set V consisting of two special values: 0x00 and 0xFF. Such values are frequently encountered in memory cache line data. The entropy determination unit 1430 may determine an entropy index value, E3, associated with the data unit 1105 consisting of n bytes where m bytes take values from a set V of cardinality |V| is given by the following equation:

$$E3 = -\log_2\left(\binom{n}{m}\left(\frac{|V|}{256}\right)^m \cdot \left(1 - \frac{|V|}{256}\right)^{n-m}\right)$$

In order for an adversary to successfully attack this pattern check unit 1230, the adversary needs to produce corrupted plaintext data demonstrating m or more bytes with special values from the set of V special values. In truly random data this can happen with probability:

$$p^{(special-values)}(n, m) \sum_{i=m}^{n} \binom{n}{i}\left(\frac{|V|}{256}\right)^i \cdot \left(1 - \frac{|V|}{256}\right)^{n-i}$$

For entropy index values corresponding to security levels of 32 bits and 24 bits, the percentages of cache lines that demonstrate such or higher entropy indexes are 63.83% and 66.47% respectively, based on the cumulative entropy index distribution for this pattern check computed over 111 million cache lines. This pattern check can also be combined with the previous ones resulting in even stronger pattern check logic 1200.

The pattern check unit 1240 computes the number of 16-bit words that are equal to each other. The entropy determination unit 1240 may determine the entropy index value, E4, associated with the data unit 1105 consisting of n words, where the number of words equal to each other is equal to m by the following equation:

$$E4 \cong --\log_2\left(\binom{n}{m}\left(\frac{1}{65536}\right)^{m-1} \cdot \left(1 - \frac{1}{65536}\right)^{n-m}\right)$$

For an adversary to successfully attack this pattern check unit 1240, the adversary needs to produce corrupted plain-text data demonstrating m or more equal words. In truly random data this happens with probability:

$$p^{(birthday-collision-words)}(n, m) \cong 1 - \prod_{i=0}^{n-1} \sum_{j=0}^{m-2} \binom{n-i-1}{j} \cdot \left(\frac{1}{65536}\right)^j \cdot \left(\frac{65535}{65536}\right)^{n-i-j-1}$$

The pattern check unit 1250 that computes the sum of the two highest, double-word frequencies may be applicable to memory pointer tables. We have observed that there are several cache lines, from the set of 111 million we experimented with, that do not exhibit significant byte or word replications, or repetitions, but contain a few pairs (1-2) of identical 32-bit or 64-bit sequences. These cache lines contain memory pointer tables. Having two pairs of the same 32-bit values appearing in a random cache line may be a rare event and may happen with probability $2^{-49.84}$. The entropy determination unit 1250 may determine the entropy index value, E5, associated with the data unit 1105 consisting of n double words, where the sum of the two highest double word frequencies is equal to m by the following equation:

$$E5 \cong -\log_2\left(\sum_{i=1}^{n} \sum_{\substack{j=1, \\ i+j=m}}^{n} \binom{n}{i}\left(\frac{1}{2^{32}}\right)^{i-1} \cdot \binom{n-i}{j}\left(\frac{1}{2^{32}-1}\right)^{j-1}\right)$$

For an adversary to successfully attack this pattern check unit 1250, the adversary needs to produce corrupted plain-text data demonstrating double words for which the sum of the two highest frequencies is greater than, or equal to m. In truly random data this happens with probability:

$$p^{(2-highest-freq-dwords)}(n, m) = \sum_{i=1}^{n} \sum_{\substack{j=1, \\ i+j\geq m, \\ i+j\leq n}}^{n} \binom{n}{i}\left(\frac{1}{2^{32}}\right)^{i-1} \cdot \binom{n-i}{j}\left(\frac{1}{2^{32}-1}\right)^{j-1}$$

As with other cases, this probability is similar, but a little higher than the value $2^{-E}$ as it includes all events where the sum of the two highest double word frequencies exceeds m in accordance with a cumulative entropy index distribution for this pattern check computed over 111 million cache lines. For entropy index values corresponding to security levels of 32 bits and 24 bits, the percentages of cache lines that demonstrate such or higher entropy indexes are both 73.096%.

The pattern check units 1260, 1270, and 1280 perform pattern checks for nibble-based patterns and may apply to data units that are 'semi-binary'. 'Semi-binary' refers to data that does not exhibit patterns at the word or byte granularity, but has an entropy index value that is low enough to support corruption detection via implicit integrity. One example of such data is media data such as images, video frames, etc. Such data units may demonstrate nibble repetitions. The pattern checks discussed herein may compute the sum of the two highest nibble frequencies in the data unit 1105. Three variants of the pattern checks consider all nibbles, most significant nibbles, and least significant nibbles. The pattern check unit 1260 may compute the sum of the two highest nibble frequencies using all nibbles of the data unit 1105. The pattern check unit 1270 may compute the sum of the two highest nibble frequencies using only the most significant nibbles from the bytes of the data unit 1105. The pattern check unit 1280 may compute the sum of the two highest nibble frequencies using only the least significant nibbles from the bytes of the data unit 1105.

In general, the entropy determination unit 1460 may calculate the entropy index, E6, associated with the data unit 1105 consisting of n nibbles, where the sum of the two highest nibble frequencies is equal to m, by the following equation:

$$E6 \cong -\log_2\left(\sum_{i=1}^{n} \sum_{\substack{j=1, \\ i+j=m}}^{n} \binom{n}{i}\left(\frac{1}{16}\right)^{i-1}\left(\frac{15}{16}\right)^{n-i} \cdot \binom{n-i}{j}\left(\frac{1}{15}\right)^{j-1}\left(\frac{14}{15}\right)^{n-i-j}\right)$$

For an adversary to successfully attack the pattern check unit 1260, the adversary needs to produce corrupted plain-text data demonstrating nibbles for which the sum of the two highest frequencies is greater than, or equal to m. In random data, this data pattern may happen with probability:

$$p^{(2-highest-freq-nibbles)} \cong$$
$$\sum_{i=1}^{n} \sum_{\substack{j=1, \\ i+j\geq m, \\ i+j\leq n}}^{n} \binom{n}{i}\left(\frac{1}{16}\right)^{i-1}\left(\frac{15}{16}\right)^{n-i} \cdot \binom{n-i}{j}\left(\frac{1}{15}\right)^{j-1}\left(\frac{14}{15}\right)^{n-i-j}$$

A benefit from using this pattern check unit, or pattern detector, comes from the fact that it can be combined with the byte and word related pattern checks resulting in a combined scheme which boosts the overall pass rates observed significantly. For the 32-bit security level, the combined scheme demonstrates a pass rate of 91.109% based on a cumulative entropy index distribution for this pattern check computed over 111 million cache lines. For the 24-bit security level the combined scheme demonstrates a pass rate of 94.476% based on the cumulative entropy index distribution for this pattern check computed over 111 million cache lines.

Figure 1F:
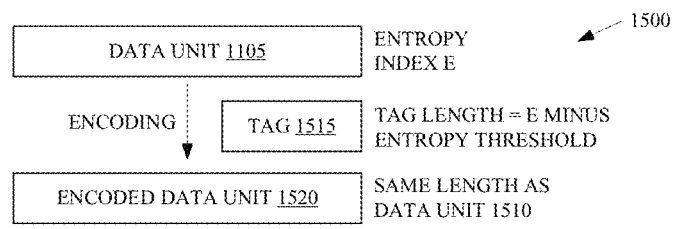
FIGS. 1F-G depict embodiments for encoding and merging a tag with a data unit and decoding and demerging the tag with the data unit for storage of the tag with the data unit without message expansion by memory logic circuitry such as the memory logic circuitry shown in FIG. 1A.

Referring now to FIGS. 1A, 1B, and 1F, FIG. 1F illustrates an embodiment 1500 for encoding and merging a tag 1515 with the data unit 1105 by the memory logic circuitry 1015, 1026, 1035, 1046, 1061, and/or 1096. The memory logic circuitry 1015, 1026, 1035, 1046, 1061, and/or 1096 may receive as an input, the data unit 1105 associated with a tag 1515 to store in memory such as the memory 1012. Through an encoding procedure, the tag 1515 becomes embedded into the encoded data unit 1520 prior to storage of the encoded data unit 1520 in the memory to support implicit integrity. In many embodiments, the memory logic circuitry 1015, 1026, 1035, 1046, 1061, and/or 1096 merges the tag 1515 with the data unit 1105 without expanding the size of the data unit 1105. In other words, the encoded data unit 1520 is the same size (same number of bits) as the data unit 1105 in such embodiments.

The memory logic circuitry 1015, 1026, 1035, 1046, 1061, and/or 1096 may 'split' the maximum entropy index value E for the data unit 1105, determined by the entropy determination logic 1400 shown in FIG. 1E, into two entropy index values $E_1$ and $E_2$. A first entropy index value $E_1$ is equal to the security level of implicit integrity which is supported by implicit integrity operations by the memory logic circuitry 1015, 1026, 1035, 1046, 1061, and/or 1096. In many embodiments, the first entropy index value is the entropy threshold value discussed in conjunction with the entropy comparison operation unit 1490 shown in FIG. 1E.

A second entropy index value, $E_2 = E - E_1$, is the difference between the entropy index value E of the data unit 1105 and the security level supported $E_1$ and is equal to the length of the tag that can be embedded into the encoded data unit 1520 without expansion of the data unit. For example, if the data unit 1105 demonstrates an entropy index value of 24 bits, this entropy index can be split into two parts. A first part $E_1 = 16$ bits reflects the overall security level offered. A second part $E_2 = 8$ bits is the maximum length of the tag 1515 that the memory logic circuitry 1015, 1026, 1035, 1046, 1061, and/or 1096 can embed into the encoded data unit 1520 without expansion. This implicit integrity operation, advantageously, provides a zero-overhead compression technique with respect to storage space, allowing for the merging of the tag 1515 into a data unit 1105 without incurring typical compression costs such as reserving bits for dictionaries, offsets, length values, etc. In many embodiments, the tag 1515 can be any value. For example, the tag 1515 may contain access control information, policy data, error correction information, and/or any other data.

Figure 1G:
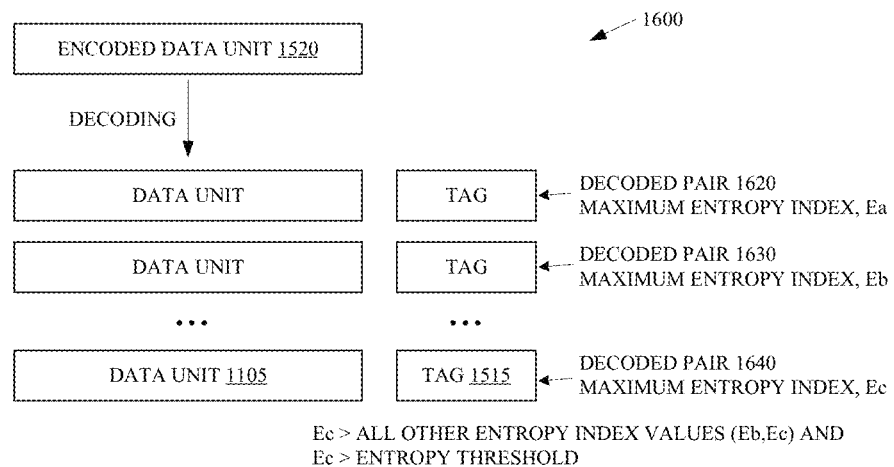
Figure 11:
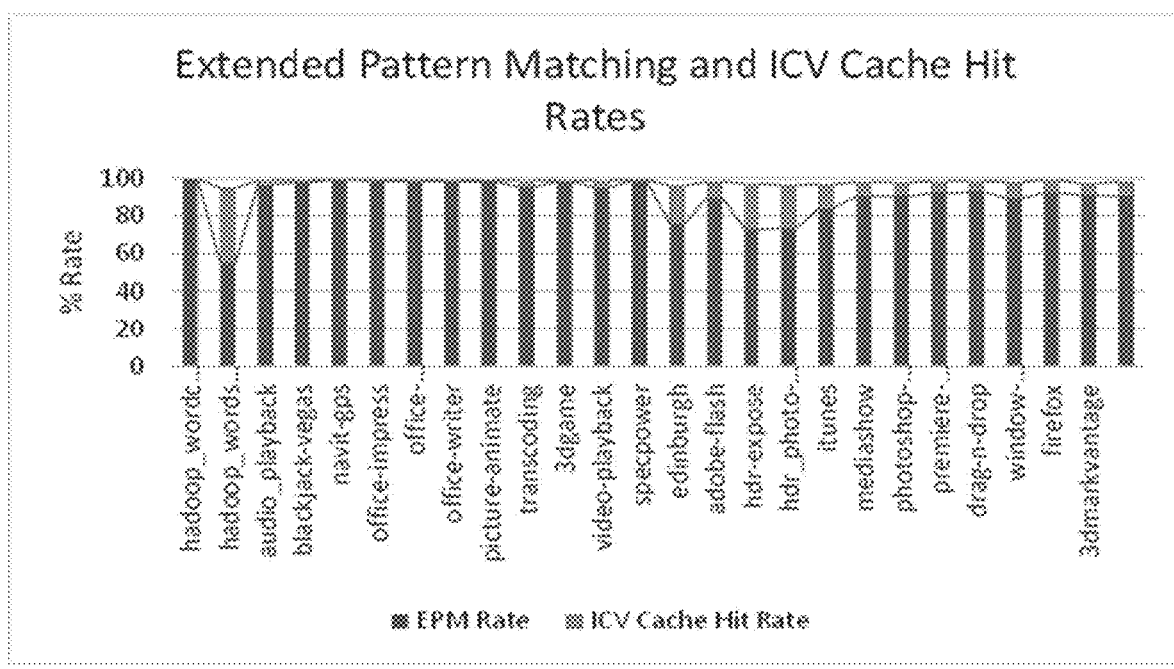

FIG. 1G illustrates a decoding procedure to demerge the tag 1515 and the data unit 1105 from the encoded data unit 1520. When the tag 1515 is merged into the encoded data unit 1520 without expansion, the decoding procedure does not uniquely return the data unit 1105. When the memory logic circuitry 1015, 1026, 1035, 1046, 1061, and/or 1096 decodes the encoded data unit 1520, the decoding procedure generates a list of decoded pairs 1620, 1630, through 1640. Each decoded pair in the list of decoded pairs 1620, 1630, through 1640 includes a data unit and a tag. If the encoded data unit 1520 has not been corrupted, one of the decoded pairs 1640 includes the data unit 1105 and the tag 1515.

Based on the specification of the encoding process, the data unit 1105 will be the least random data unit in the decoded pairs. Thus, the memory logic circuitry 1015, 1026, 1035, 1046, 1061, and/or 1096 may determine which decoded pair of the list of decoded pairs 1620, 1630, through 1640 contains the data unit 1105 and the tag 1515 by implementing the entropy determination logic 1400 to calculate the maximum entropy index value for each of the data units in the decoded pairs. In particular, the entropy determination logic 1400 may calculate, for example, entropy index values E1 through E8 and determine the highest entropy index value of the entropy index values E1 through E8. The decoded pair with the highest, maximum entropy index value includes the data unit 1105 and the tag 1515.

To illustrate, the list of decoded pairs 1620, 1630, through 1640 includes maximum entropy index values Ea for the decoded pair 1620, Eb for the decoded pair 1630, and Ec for the decoded pair 1640. These maximum entropy index values Ea, Eb, and Ec are maximum of the entropy index values that the entropy determination logic 1400 calculates for the data unit within each of these decoded pairs. Demerging logic of the memory logic circuitry 1015, 1026, 1035, 1046, 1061, and/or 1096 may determine which decoded pair includes the data unit 1105 and the tag 1515 by comparing the maximum entropy index values Ea, Eb, and Ec to determine which decoded pair has the highest maximum entropy index value. In the present embodiment, Ec is greater than Eb and is greater than Ea so the decoded pair 1640 includes the data unit 1105 and the tag 1515.

In many embodiments, the entropy determination logic 1400 compares the maximum entropy index value Ec against the entropy threshold value to determine if Ec is greater than the entropy threshold value. The entropy threshold value may relate to a level of security such as a 64-bit security level. The memory logic circuitry 1015, 1026, 1035, 1046, 1061, and/or 1096 may provide protection against intentional alteration of the encoded data unit 1520 by requiring the data unit 1105 to demonstrate an entropy index value which is higher than the entropy threshold value. The memory logic circuitry 1015, 1026, 1035, 1046, 1061, and/or 1096 may provide lossless recovery of the embedded tag value tag 1515 by determining which data unit is the least random from among the returned data units, by obtaining its associated tag 1515, and by confirming that the maximum entropy index value of the data unit is greater than the entropy threshold value.

If Ec is less than the entropy threshold value, the encoded data unit 1520 may be corrupted and the decoded pair 1640 may not be valid. In such instances, embodiments may perform one or more different data integrity operations. For example, the memory logic circuitry 1015, 1026, 1035, 1046, 1061, and/or 1096 may determine that the encoded data unit 1520 is corrupted; may perform corrective measures on the encoded data unit 1520 and perform the decoding process again; may determine that the encoded data unit 1520 is not encoded with the implicit integrity operations and may search for an associated MAC or ICV to decode the encoded data unit 1520 with the MAC or ICV; and/or may search for error correction information to perform error correction on the encoded data unit 1520. In further embodiments, the memory logic circuitry 1015, 1026, 1035, 1046, 1061, and/or 1096 may perform other data integrity operations.

FIG. 1I depicts an embodiment of graph 1800 of a demonstration of the pass rates for cache lines using implicit data integrity and the pass rates for cache lines using Integrity Check Values (ICVs), where ICVs are stored in an ICV cache unit. The graph 1800 shows that if you use a small cache unit for ICVs, the cumulative pass rate jumps to over 95%.

The results in the graph 1800 are based on a level of security (31 bits) and are collected from 111 million representative client workload cache lines and from 1.47 billion representative server workload cache lines. The pass rate comparisons are between the standard ICV cache hit rates and an embodiment of the memory logic 1015, 1026, 1035, 1046, 1061, and/or 1096 and indicate the percentage of cache lines that are compatible with corresponding integrity operations.

The pass rates for many different client workloads are shown such Microsoft Office, transcoding, video player, with pass rates that around 98% when Extended Pattern Matching is employed. Overall, the average pass rate with Extended Pattern Matching is 91%. For server data, the corresponding pass rate value is 84%. The graph 1800 also shows Integrity Check Value (ICV) cache hit rates for these algorithms.

Referring now to FIGS. 1A, 1B, and 1J, FIG. 1J illustrates an embodiment of implicit data integrity operations 1900 by the memory logic circuitry 1015, 1026, 1035, 1046, 1061, and/or 1096 that include error correction codes in tags for correction of corrupted, encoded data units. In the present embodiment, the memory logic circuitry 1015, 1026, 1035, 1046, 1061, and/or 1096 may decrypt the encrypted blocks 1 through N illustrated in row 1910. A decoder logic, shown in row 1920, of the memory logic circuitry 1015, 1026, 1035, 1046, 1061, and/or 1096 may decrypt and demerge blocks 1 through N shown in block 1930 along with associated tags 0 through N.

In this embodiment, the encoder logic computes each error correction code from a ciphertext block as opposed to a plaintext block. Furthermore, for embodiments in which the message blocks form a chain, the encoder logic embeds each error correction code with an adjacent message block so that the error correction code is available from the tag included in the, e.g., previously decoded, encrypted block. In some embodiments, encoder logic of the memory logic circuitry 1015, 1026, 1035, 1046, 1061, and/or 1096 may encrypt the blocks 1 through N and decrypt the blocks 1 through N in groups of M blocks where M can be any positive integer. In some embodiments, the encoder logic may encrypt the last block, block N, without an embedded tag, or with a tag containing information not related to error correction (e.g., information that can be access control related). In several embodiments, the encoder logic may not embed a tag with error correction code for the first block in the chain, but instead, may store the error correction code separately.

Each encrypted block 1 through N may include a tag that has error correction code for the subsequent encrypted block. In particular, the tags 0 through N include error correction code for correcting errors in the encrypted blocks 1 through N. The tag 0 is error correction code for the encrypted block 1. The tag 0 may be merged with a previously demerged block 0 in an encrypted block 0 or may be stored in a separate location of memory from which the decoder logic receives the encrypted block 1. If the decoder logic determines that decoded pairs determined from the encrypted block 1, such as the decoded pairs 1620, 1630, through 1640, all have a maximum entropy index value that is less than an entropy threshold value, the decoder logic may determine that the encrypted block 1 is corrupted and may perform error correction to encrypted block 1 with the tag 0. Thereafter, the decoder logic may attempt to decrypt and demerge the encrypted block 1 again to determine that the block 1 and the tag 1 is the uncorrupted, decrypted data unit and tag for the encrypted block 1.

After demerging the block 1 and the tag 1 from the encrypted block 1, the decoder logic may decode and demerge the encrypted block 2. If the decoder logic determines that the encrypted block 2 is corrupted, the correction logic of the memory logic circuitry 1015, 1026, 1035, 1046, 1061, and/or 1096 may perform error correction measures with the error correction code in the tag 1 on the encrypted block 2. Thereafter, the decoder logic may decode the encrypted block 2 to determine that the block 2 and the tag 2 are the uncorrupted, decrypted decoded pair for the encrypted block 2 based on the block 2 having the highest, maximum entropy index value and verification that the maximum entropy index value for the block 2 is greater than the entropy threshold value. This process may continue until the decoder logic decrypts the encrypted blocks through the encrypted block N.

FIG. 1K depicts an embodiment of a code snippet to perform pattern checking and to compare repetitions of entities within a data unit, or message, against threshold values. In the present embodiment, the code snippet performs six of the eight pattern checks performed by the pattern check units 1210 through 1280 shown in FIG. 1C. The output of the code snippet includes a Boolean response of true or false. A true output indicates that the data unit passes and a false output indicates that the data unit fails or does not pass.

The code snippet passes the data unit if the pattern check logic determines that the repetitions of entities in the data unit for at least one of the patterns is equal to or exceeds the threshold value for the at least one the patterns. Otherwise, the code snippet outputs a fail.

In some embodiments, if the data unit such as the data unit 1105 fails, the data unit may be corrupted, may be an encoded data unit, or may include data that is too random for the current embodiment to distinguish the data unit from random data.

In further embodiments, the code snippet may test data for compatibility with implicit integrity operations. If the data unit is distinguishable from random data, the memory logic circuitry 1015, 1026, 1035, 1046, 1061, and/or 1096 may encrypt the data unit with implicit integrity operations for storage in memory or merge a tag with the data unit during encryption and store the encrypted data unit in memory.

If the data unit is not distinguishable from random data, the memory logic circuitry 1015, 1026, 1035, 1046, 1061, and/or 1096 may protect the data unit with a MAC or ICV and store both the encrypted data unit and the MAC or ICV in memory.

FIG. 1L(A-C) depicts an embodiment of a code snippet to perform pattern checking and to compare repetitions of entities within a data unit against an entropy index threshold value. In the present embodiment, the code snippet performs the eight pattern checks performed by the pattern check units 1210 through 1280 shown in FIG. 1C. The output of the code snippet includes a maximum-security operator to indicate the maximum entropy index value for a data unit, a best behavior operator to indicate the pattern that has the highest or maximum entropy index value, and a cumulative security operator to indicate the probability of detecting the pattern in random data.

After performing the entropy determinations, an encoder logic of the memory logic circuitry 1015, 1026, 1035, 1046, 1061, and/or 1096 may determine the maximum size tag that can be merged with the data unit in an encrypted data unit for storage in memory. In some embodiments, the encoder logic may confirm that a tag of a fixed size can be embedded with the data unit in an encrypted data unit. Note that an encrypted data unit is an encoded data unit that is encoded with cryptographic operations.

FIG. 1M(A-D) depicts an embodiment of a code snippet to encode a data unit that is a cache line with a tag to merge the data unit with the tag without message expansion. The code snippet implements implicit integrity operations of an encryptor logic of the memory logic circuitry 1015, 1026, 1035, 1046, 1061, and/or 1096 to embed a tag with a cache line in an encrypted data unit using Advanced Encryption Standard (AES) keys.

The code snippet works in conjunction with a decoding code snippet not shown in the Figure. The encoding snippet determines if the data unit is encodable. Both the encoding and the decoding code snippets determine if the data unit is of low entropy by verifying the outputs from the threshold comparison logic 1300 shown in FIG. 1D and the entropy determination logic 1400 shown in FIG. 1E. Thereafter, the code snippets retrieve the most significant bits using a first set of secrets and a mask exposing the cache line's most significant bits. Then, the code snippets obtain a number of suggested values for the least significant bits and the embedded tag using a second set of secrets and a mask exposing information about the cache line's least significant bits. By doing so, the code snippets can embed or extract any tag into any cache line, with a sufficiently high entropy index, without typical overhead such as compression meta-data, offsets, etc. For purposes of this illustration in this embodiment, the data unit or cache line is referred to as a message A.

The code snippet first encrypts the message A using the first stage key $K_d$ producing a quantity A'. The purpose of this encryption stage is to support strong confusion and diffusion on the input bits of the message A, making each bit of the entity to be encoded (A') strongly dependent of all the bits of the original message A.

$$A' \leftarrow E_{K_d}(A) \qquad \text{Eq. 1}$$

The code snippet uses two masks defined in Eq. 2-4. A low order mask $m_1$ is a first k-bit secret value that may derive from the master key, or the tweak T. A high order mask $M_1$ is a second k-bit secret value followed by 2k zeros that may too derive from the master key, or the tweak T.

$$m_1 \leftarrow \text{k-bit secret that derives from the master key, or the tweak } T \qquad \text{Eq. 2}$$

$$S_M \leftarrow \text{k-bit secret that derives from the master key, or the tweak } T \qquad \text{Eq. 3}$$

$$M_1 \leftarrow S_M | \{0\}^{2k} \qquad \text{Eq. 4}$$

We note that in the description that follows operators $\text{msb}_w(\ )$ and $\text{lsb}_w(\ )$ refer to the w most and least significant bits of an entity respectively, the operator $\{0\}^w$ refers to a string of w zeros, and the symbol '|' represents a concatenation operation.

From the secret $S_2$, the code snippet computes secrets $S_1$, $S_3$ and $S_4$ for use during the encoding and decoding processes. The code snippet performs the computations in the field, $GF(p^q)$ where p is a prime modulus and $\text{ceiling}(\log_2 p) \cdot q = n$ bits. The derivation of these secrets is shown in Eq. 5.

$$S_3 \leftarrow S_2^{-1} \cdot m_1$$

$$S_1 \leftarrow S_3^{-1} = S_2 \cdot m_1^{-1}$$

$$S_4 \leftarrow S_2^{-1} \cdot M_1 \qquad \text{Eq. 5}$$

From Eq. 5 it is evident that secrets $S_1$, $S_3$ and $S_4$ may be dense, 'look random' and be as difficult to guess as secret $S_2$. Secrets $S_1$, $S_3$ and $S_4$ satisfy some interesting properties useful in the encoding and decoding processes. Multiplication of $S_1$ with $S_3$ returns 1. Multiplication of $S_2$ and $S_3$ returns the low order mask $m_1$. Multiplication of $S_2$ and $S_4$ returns the high order mask $M_1$. Finally, the product of $S_1$ and $S_4$ is equal to $m_1^{-1} \cdot M_1$ which should also be difficult to guess, especially for large values of k. These properties are shown in Eq. 6.

$$S_1 \cdot S_3 = 1$$

$$S_2 \cdot S_3 = m_1$$

$$S_2 \cdot S_4 = M_1$$

$$S_1 \cdot S_4 = m_1^{-1} \cdot M_1 \qquad \text{Eq. 6}$$

To encode the quantity A' together with the tag B the algorithm computes quantity Q as:

$$Q \leftarrow A' \cdot S_1 + B \cdot S_2 \qquad \text{Eq. 7}$$

where in Eq. 7, the code snippet performs the computations in $GF(p^q)$. The code snippet then encrypts Q using the encryption key $K_e$, producing ciphertext C.

$$C \leftarrow E_{K_e}(Q) \qquad \text{Eq. 8}$$

The Ciphertext C represents the encrypted data unit of the original message A, where the encryption operation includes operations to embed the tag B into the ciphertext. The length of C is equal to the length of A so the memory logic circuitry can store C without using additional storage for the tag. The length parameter k should be $\leq n/2$.

While the code snippet for decoding the encrypted data unit C is not included in FIG. 1M(a-d), a decryptor logic of the memory logic circuitry 1015, 1026, 1035, 1046, 1061, and/or 1096 may use the same keys as the encryptor logic in the code snippet above. The encryptor logic may receive the encrypted data unit with the ciphertext C from memory.

In many embodiments, to process ciphertext C, a code snippet first decrypts C using key $K_e$ to obtain the quantity Q. the algorithm sets:

$$Q \leftarrow D_{K_e}(C) \qquad \text{Eq. 9}$$

The algorithm then multiplies Q with secret $S_3$ to obtain a value $V_1$:

$$V_1 \leftarrow Q \cdot S_3 \qquad \text{Eq. 10}$$

Lemma 1: If no corruption has occurred then the value $V_1$ should be equal to $A' + B \cdot m_1$ Proof of Lemma 1: $Q \cdot S_3 = A' \cdot S_1 \cdot S_3 + B \cdot S_2 \cdot S_3 = A' + B \cdot m_1$ using the properties of Eq. 6. From the value $V_1$ the algorithm computes a second quantity $V_2$ defined as the n−2k most significant bits of $V_1$:

$$V_2 \leftarrow \text{msb}_{n-2k}(V_1) \qquad \text{Eq. 11}$$

Lemma 2: If no corruption has occurred then the value $V_2$ should be equal to the n−2k most significant bits of A'.

Proof of Lemma 2: Without significant loss of generality we can assume that operations in the finite field $GF(p^k)$ do not propagate carries across 2k-bit quantities. It is easy to see that the quantity $B \cdot m_1$ has a size no greater than 2k bits. Furthermore, the addition of $B \cdot m_1$ to A' does not result in carry propagation from the 2k least significant bits of $A' + B \cdot m_1$ to its n−2k most significant bits. Hence:

$$V_2 \leftarrow \text{msb}_{n-2k}(A') \qquad \text{Eq. 12}$$

and lemma 2 is proven.

Having recovered the n−2k most significant bits of A', the code snippet proceeds in recovering suggested values for the 2k least significant bits of A'. To do this, the code snippet multiplies Q with secret $S_4$ and subtracts the recovered n−2k most significant bits of A' times $S_1 \cdot S_4$ to obtain a value $V_3$:

$$V_3 \leftarrow Q \cdot S_4 - (V_2|\{0\}^{2k}) \cdot S_1 \cdot S_4 \qquad \text{Eq. 13}$$

Lemma 3: If no corruption has occurred then the value $V_3$ is equal to $\text{lsb}_{2k}(A') \cdot m_1^{-1} \cdot M_1 + B \cdot M_1$.

Proof of Lemma 3: $Q \cdot S_4 = A' \cdot S_1 \cdot S_4 + B \cdot S_2 \cdot S_4 = A' \cdot m_1^{-1} \cdot M_1 + B \cdot M_1$ using the properties of Eq. 6. On the other hand, $(V_2|\{0\}^{2k}) \cdot S_1 \cdot S_4 = (\text{msb}_{n-2k}(A')|\{0\}^{2k}) \cdot m_1^{-1} \cdot M_1$. Subtracting this quantity from $A' \cdot m_1^{-1} \cdot M_1$ results in a value equal to $\text{lsb}_{2k}(A') \cdot m_1^{-1} \cdot M_1$. Hence Lemma 3 is proven.

From the value $V_3$ the code snippet computes quantity $V_4$ defined as:

$$V_4 \leftarrow \text{lsb}_{2k}(V_3) \qquad \text{Eq. 14}$$

Lemma 4: If no corruption has occurred then the value $V_4$ should be equal to the 2k least significant bits of the quantity $\text{lsb}_{2k}(A') \cdot m_1^{-1} \cdot M_1$.

Proof of Lemma 4: We can assume that operations in the finite field $GF(p^q)$ do not propagate carries across 2k bit quantities. From the definition of the high order mask $M_1$ and the fact that the tag B does not exceed k bits in size, it is evident that the quantity $B \cdot M_1$ has the 2k least significant bits set to zero. As a result:

$$V_4 = lsb_{2k}(lsb_{2k}(A') \cdot m_1^{-1} M_1) \quad \text{Eq. 15}$$

and lemma 4 is proven.

The code snippet may determine solutions for the 2k-bit unknown quantity $lsb_{2k}(A')$ from Eq. 15 and from knowledge of the values $V_4$ and Eq. 15 describes a system of equations where the unknowns are the elements of the quantity $lsb_{2k}(A')$, the number of equations are as many as the unknowns and, furthermore the equations are linear. If the determinant of the system of Eq. 15 were not zero, then the system of Eq. 15 would deterministically return the 2k least significant bits of A' from which the embedded tag B would derive. This would result in a paradox where our n-bit encoding would deterministically be reversible, resulting in perfect recovery of both the n-bit original message and the k-bit tag. Since, this is not possible, the determinant of the system of Eq. 15 must always be zero. This property has been observed in practice too. For these reasons, the system of Eq. 15 returns not a single solution but $2^k$ possible solutions for the least significant bits $lsb_{2k}(A')$, from which $2^k$ corresponding values for the tag B derive.

From these solutions, only one solution (one pair) is the least random, and, in many embodiments, the one pair should exhibit patterns associated with some minimum-security level, or entropy threshold value. For example, the entropy threshold value may be 24 bits. Corruption is detected if the solution with the highest entropy index value returned with the $2^k$ possible solutions, does not demonstrate entropy index value higher than the entropy threshold value. The code snippet may recover the embedded tag B by setting the tag B equal to the tag associated with the message that has the highest, maximum entropy index value amongst the $2^k$ possible solutions if the highest, maximum entropy index value is also greater than the entropy threshold value.

In solving the system of Eq. 15, the code snippet obtains a plurality of solutions. Let one solution be $V_5$. From values $V_2$ and $V_5$, the code snippet obtains a suggested value A" for the encoded quantity A' as the concatenation of $V_2$ and $V_5$.

$$A'' = V_2 | V_5 \quad \text{Eq. 16}$$

From the value A", the code snippet computes a suggested value for the embedded tag B". The procedure followed is based on Eq. 7:

$$B'' = (Q - A'' \cdot S_1) \cdot S_2^{-1} \quad \text{Eq. 17}$$

The code snippet repeats the steps of Eq. 16 and Eq. 17 and reverses the encryption of Eq. 1 for all $2^k$ solutions of Eq. 15 to obtain $2^k$ values for the original message A. The last implicit integrity operation involves implementing the entropy determination logic 1400 to determine a suggested value A from among the returned ones with highest, maximum entropy index value and its associated tag B. This value A is the least random one from among the returned values and is further checked by the code snippet to determine if the computed, maximum entropy index value for this value A is higher than the entropy threshold value. If so, the code snippet returns the value A and the associated tag B as the decoded value and tag. If the data unit which is encoded becomes corrupted, the $2^k$ solutions of Eq. 15 will result in $2^k$ random values for A. The probability that the least random solution exhibits an entropy index value, which is higher than a specific threshold E is equal to $2^{-(E-k)}$. This fact indicates that the algorithm supports a security level of E−k bits of implicit integrity. This fact also indicates that the entropy index E, which characterizes the data unit that is encoded, is sum of two entropy index values. A first value is equal to E−k and is further equal to the security level offered. A second value is equal to k bits and is further equal to the length of the tag that can be embedded into the message A without message expansion. The concept can be further applied on groups of message blocks. For example, setting E=10 and k=6 over sets of 8 cache lines, results in 32 bits of security and the ability to embed 48 bits of extra content into the cache lines.

Referring again to FIG. 1A, the first processor 1010 couples to a chipset 1060 via P-P interconnects 1052 and 1062 and the second processor 1030 couples to a chipset 1060 via P-P interconnects 1054 and 1064. Direct Media Interfaces (DMIs) 1057 and 1058 may couple the P-P interconnects 1052 and 1062 and the P-P interconnects 1054 and 1064, respectively. The DMI may be a high-speed interconnect that facilitates, e.g., eight Giga Transfers per second (GT/s) such as DMI 3.0. In other embodiments, the processors 1010 and 1030 may interconnect via a bus.

The chipset 1060 may comprise a controller hub such as a platform controller hub (PCH). The chipset 1060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 1060 may comprise more than one controller hub such as a chipset with a memory controller hub, a graphics controller hub, and an input/output (I/O) controller hub.

In the present embodiment, the chipset 1060 may comprise an interface (I/F) 1066 coupled with the flash storage 1067. The I/F 1066 may be, for example, a Peripheral Component Interconnect-enhanced (PCI-e). The chipset 1060 may also couple with a trusted platform module (TPM) 1072 and the UEFI, BIOS, Flash component 1074 via an interface (I/F) 1070. The TPM 1072 is a dedicated microcontroller designed to secure hardware by integrating cryptographic keys into devices. The UEFI, BIOS, Flash component 1074 may provide pre-boot code.

Furthermore, chipset 1060 includes an I/F 1066 to couple chipset 1060 with a high-performance graphics engine, graphics card 1065. In other embodiments, the system 1000 may include a flexible display interface (FDI) between the processors 1010 and 1030 and the chipset 1060. The FDI interconnects a graphics processor core in a processor with the chipset 1060.

Various I/O devices 1092 couple to the bus 1081, along with a bus bridge 1080 which couples the bus 1081 to a second bus 1091 and an I/F 1068 that connects the bus 1081 with the chipset 1060. In one embodiment, the second bus 1091 may be a low pin count (LPC) bus. Various devices may couple to the second bus 1091 including, for example, a keyboard 1082, a mouse 1084, communication devices 1086 and a data storage unit 1088 that may store code such as the compiler 1096. Furthermore, an audio I/O 1090 may couple to second bus 1091. Many of the I/O devices 1092, communication devices 1086, and the data storage unit 1088 may reside on the motherboard 1005 while the keyboard 1082 and the mouse 1084 may be add-on peripherals. In other embodiments, some or all the I/O devices 1092, communication devices 1086, and the data storage unit 1088 are add-on peripherals and do not reside on the motherboard 1005.

Figure 2:
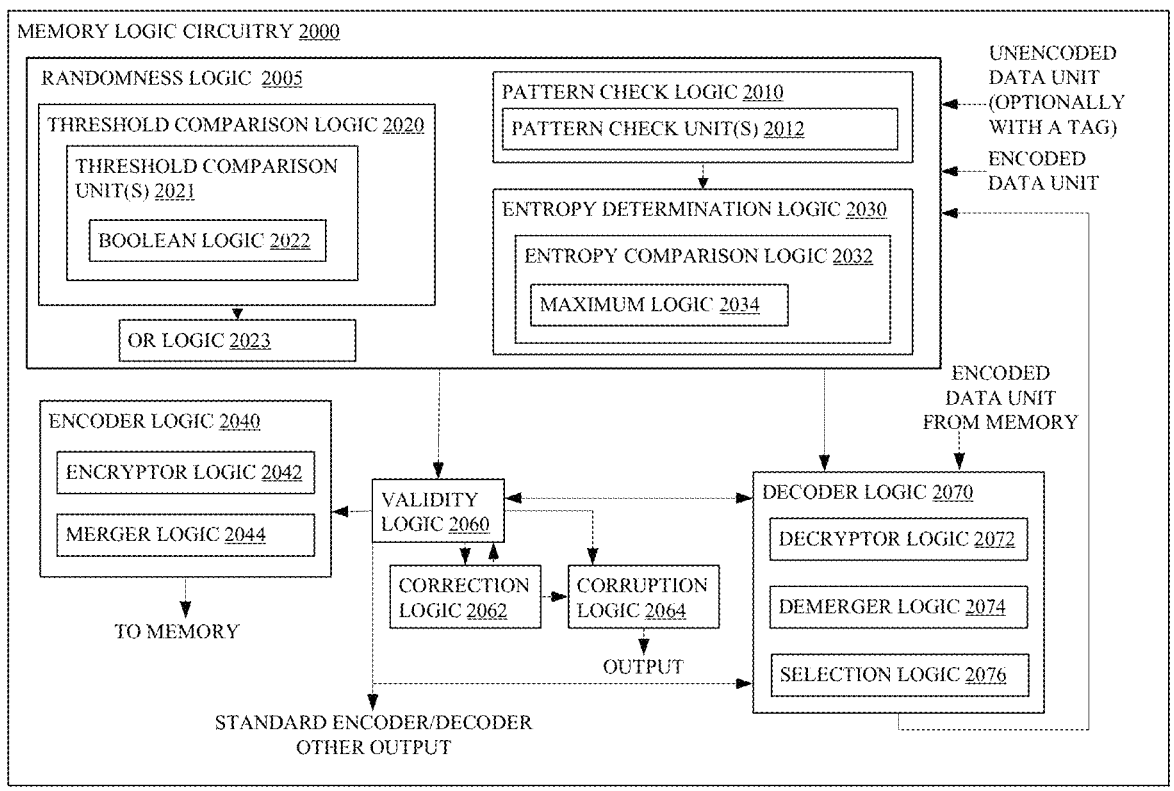
FIG. 2 depicts an embodiment of memory logic circuitry such as the memory logic circuitry shown in FIG. 1A.

FIG. 2 depicts an embodiment of a memory logic circuitry 2000 to perform implicit data integrity operations. The memory logic circuitry 2000 may reside in any memory controller such as an integrated memory controller, a solid-state drive controller, a flash memory controller, a hard-drive controller, a cache controller, and/or the like. The memory logic circuitry 2000 may also implement any portion of or all the operations or processes discussed in conjunction with the memory logic circuitry 1015, 1026, 1035, 1046, 1061, and/or 1096 with any type of data storage device. For example, the memory logic circuitry 2000 may encode or encrypt some or all data units stored in main memory such as the memory 1012 shown in FIG. 1A and some or all data units stored in the data storage device 1088 shown in FIG. 1A.

The memory logic circuitry 2000 may comprise circuitry; a combination of circuitry, code, and a processor to execute the code; or a combination of code and a processor to execute the code such as the code snippets illustrated in and discussed in conjunction with FIGS. 1K, 1L(a-c), and 1M(a-d). For instance, the memory logic circuitry 2000 may comprise a state machine and/or application-specific integrated circuit (ASIC) to perform some or all the functionality of the memory logic circuitry 2000.

The memory logic circuitry 2000 may receive unencoded data units to store in memory or encoded data units retrieved from memory. In some embodiments, the memory logic circuitry 2000 may test data units to detect encrypted data units that should be unencoded data units.

The memory logic circuitry 2000 may comprise randomness logic 2005. The randomness logic 2005 may determine the randomness of a data unit. In many embodiments, the memory logic circuitry 2000 may determine if a data unit is compatible with implicit integrity operations. In the present embodiment, the randomness logic 2005 comprises a pattern check logic 2010, a threshold comparison logic 2020, and an entropy determination logic 2030. The randomness logic 2005 may selectively implement the threshold comparison logic 2020, the pattern check logic 2010 with the entropy determination logic 2030, or both.

The threshold comparison logic 2020 may compute a value indicative of whether or not a pattern of entities exists in a data unit and whether the number of repetitions of the pattern in the data unit exceeds a threshold value for the pattern such as the patterns described in conjunction with FIGS. 1C and 1D. In many embodiments, the threshold comparison logic 2020 determines the value directly from the input, the data unit 1105, without first determining a count of the repetitions and comparing the count with the threshold. Such embodiments advantageously make efficient use of silicon area on an integrated circuit, for embodiments implemented at least in part in the integrated circuit, and make efficient use of processor cycles, for embodiments that implement such functionality with code.

In further embodiments, the threshold comparison logic 2020 may determine counts of patterns of entities in the data unit and compare each of the counts or values to a set of one or more threshold values. In many embodiments, the threshold comparison logic 2020 determines or has a different threshold value for each pattern in the threshold comparison unit(s) 2021. For instance, the threshold comparison logic 2020 may comprise or have access to a table of threshold values. The table of threshold values may include threshold values for one or more different levels of security. For instance, the threshold values table may include values for each of the patterns of the threshold comparison unit(s) 2021 for 32-bit security, 64-bit security, 128-bit security, and/or the like. In further embodiments, threshold comparison logic 2020 may comprise an equation or computation for each of the threshold values in the threshold values table to adjust the threshold values based on a selected level of security.

The threshold comparison logic 2020 may compare each of the counts of the patterns of the threshold comparison unit(s) 2021 to determine if each count is greater than or equal to the corresponding threshold value. The threshold comparison logic 2020 may determine an indication for each of the threshold comparison unit(s) 2021 such as a true or false indication or a logical one-bit or logical zero-bit indication. In many embodiments, if the threshold comparison logic 2020 identifies at least one pattern in the data unit exists and the count of repetitions of the pattern exceeds a corresponding threshold value, the data unit is distinguishable from random data. The threshold comparison logic 2020 may output an indication such as a true or false indication or a logical one-bit or logical zero-bit indication to indicate that the data unit is distinguishable from random data or is not distinguishable from random data, respectively. For example, the threshold comparison logic 2020 may comprise Boolean logic 2022 to determine a true for each count that is greater than or equal to a corresponding threshold value and a false for each count that is less than the corresponding threshold value. In some embodiments, the Boolean logic 2022 may output a true to indicate that at least one of the counts is equal to or greater than the corresponding threshold value or a false to indicate that none of the counts are equal to or greater than the corresponding threshold value.

The pattern check logic 2010 may attempt to identify one or more patterns of bits in the data unit. In many embodiments, the patterns of bits may comprise repetitions of one or more entities. An entity is a group of two or more bits such as a nibble, a byte, a word, and a double-word. The nibble may be a half of a byte, which is four bits. The byte is eight bits. The word may be 16 bits and the double-word may be 32 bits. In other embodiments, a word may be defined as a different number of bits such as 8 bits or 32 bits and a double-word is the size of two words but the discussions herein define a word as 16 bits to avoid confusion.

The pattern check logic 2010 may comprise one or more pattern check unit(s) 2012 such as the pattern check units 1210 through 1280 shown in FIG. 1C. The pattern check unit(s) 2012 may divide the data unit into entities such as nibbles, bytes, words, or double-words, and determine if a particular pattern of one or more entities exist in the data unit. For instance, the pattern check unit(s) 2012 may determine a count of the total number of repetitions of an entity exist in the data unit that are equal. In some embodiments, the entity may be a specific nibble, byte, word, or double-word such as a special value or any value from a set of special values. In some embodiments, the pattern check unit(s) 2012 may determine a count of each different entity in the data unit and determine the maximum count or the two highest counts.

In several embodiments, the pattern check logic 2010 may selectively implement one or more pattern check unit(s) 2012 based on the data unit or other factors. In other embodiments, the pattern check logic 2010 may implement all available pattern check unit(s) 2012 for each data unit.

After performing the pattern checks, each of the pattern check unit(s) 2012 may output a count or value that represents, indicates, or is equal to the sum of the repetitions of entities in the data unit that correspond to a pattern detected by the pattern check unit. In some embodiments, the pattern check logic 2010 transmits the outputs to the entropy determination logic 2030.

The entropy determination logic 2030 may receive the counts from each of the pattern check unit(s) 2012 and determine an entropy index value for counts associated with the data unit from each of the pattern check unit(s) 2012. In some embodiments, the entropy determination logic 2030 may selectively determine entropy index values for the counts from one or more of the pattern check unit(s) 2012.

After determining the entropy index values, an entropy comparison logic 2032 of the entropy determination logic 2030 may compare the entropy index values to an entropy threshold value. In many embodiments, the entropy comparison logic 2032 comprises a maximum logic 2034 that determines the maximum entropy index value from the entropy index values calculated from the counts for each of the pattern check unit(s) 2012 and compares the maximum entropy index values to the entropy threshold value. The entropy threshold value may be related to a level of security and both the maximum entropy index value and the entropy threshold value may indicate a number of bits, or bit count.

The memory logic circuitry 2000 may determine if the data unit is corrupt or incompatible with implicit integrity operations based on the results of the comparison of the maximum entropy index value for the data unit against the entropy threshold value. In several embodiments, if the maximum entropy index value is less than the entropy threshold value and the data unit is unencoded data received by the memory logic circuitry 2000 to store in memory, validity logic 2060 of the memory logic circuitry 2000 may determine that the data unit is not compatible with the implicit integrity operations and perform standard data integrity operations such as calculating and separately storing a MAC or ICV associated with the data unit. On the other hand, if the maximum entropy index value is greater than the entropy threshold value and the data unit is unencoded data received by the memory logic circuitry 2000 to store in memory, the validity logic 2060 of the memory logic circuitry 2000 may determine that the data unit is compatible with the implicit integrity operations and pass the data unit and optionally an associated tag to the encoder logic 2040.

The encoder logic 2040 may receive an unencoded data unit that is compatible with implicit integrity operations of the memory logic circuitry 2000 and implement encryptor logic 2042 to encrypt the data unit. The encryptor logic 2042 may comprise one or more keys, tweaks, masks, and/or the like to encrypt the data unit. In many embodiments, the encoder logic 2040 receives the data unit with a tag or generates or selects a tag to include with the data unit. For instance, the encoder logic 2040 may receive the data unit and perform a hash operation to determine an error correction code to include in a tag with the data unit.

The encoder logic 2040 may comprise merger logic 2044 to operate in conjunction with the encryptor logic 2042 to encrypt and merge the data unit with the tag during creation of an encoded data unit. In some embodiments, the merger logic 2044 may determine if the tag can be merged with the data unit. For example, the merger logic 2044 may subtract the entropy threshold value from the maximum entropy index value for the data unit to determine a maximum size of the tag. If the tag is less than or equal to the maximum size for the tag, the merger logic 2044 may merge the tag with the data unit in the encoded data unit without expanding the size of the data unit. In other embodiments, the encoder logic 2040 may generate a tag that is less than or equal to the maximum size for the tag.

After creating or determining an encoded data unit for the data unit, the memory logic 2000 may store the encoded data unit in memory.

The memory logic circuitry 2000 may also comprise decoder logic 2070 to decode an encoded data unit retrieved from the memory. The decoder logic 2070 may comprise a decryptor logic 2072, a demerger logic 2074, and a selection logic 2076. The decryptor logic 2072 may comprise one or more keys, tweaks, masks, and/or the like to decrypt the encoded data unit. In several embodiments, the decryptor logic 2072 may operate with the demerger logic 2074 to decrypt and demerge the tag and the data unit from the encoded data unit. In several embodiments, the decryptor logic 2072 and demerger logic 2074 generate a list of suggested pairs of data units and tags while decoding the encoded data unit. If the encoded data unit is not corrupted, the list of suggested pairs includes the data unit and the tag that can be identified by selecting the data unit that is the least random amongst the data units in the list of suggested pairs.

The decoder logic 2070 may comprise selection logic 2076 to interact with the randomness logic 2005 to determine which data unit of the list of suggested pairs has the lowest level of randomness. In many embodiments, the selection logic 2076 may interact with the entropy determination logic 2030 to determine the least random data unit of the suggested pairs. In other embodiments, the selection logic 2076 may interact with the threshold comparison logic 2020 to determine the least random data unit. In further embodiments, the selection logic 2076 may interact with both the threshold comparison logic 2020 and the entropy determination logic 2030 to determine the least random data unit of the suggested pairs.

The entropy determination logic 2030 may also compare the maximum entropy index value for the least random data unit against the entropy threshold value to determine if the entropy of the least random data unit exceeds or is equal to the entropy threshold value. If the entropy of the least random data unit exceeds or is equal to the entropy threshold value, the decoder logic 2070 may output the least random data unit and optionally an associated tag. On the other hand, if the entropy of the least random data unit is less than the entropy threshold value, the decoder logic 2070 may determine that the encoded data unit is corrupted and inform the validity logic 2060. The validity logic 2060 may determine to perform corrective measures on the encoded data unit, if available, and instruct the correction logic 2062 to perform the corrective measures. The correction logic 2062 may perform corrective measures such as error correction with error correction code, or other corrective measures.

After performing corrective measures, the decoder logic 2070 may begin the decryption and demerging operations again to generate a list of suggested pairs of data units and tags. Thereafter, the randomness logic 2005 may determine the least random data unit among the pairs and compare the maximum index value of the least random data unit in the list of suggested pairs against the entropy threshold value to determine if the data unit is valid. If so, the decoder logic 2070 may output the least random data unit and optionally the associated tag. If the maximum index value of the least random data unit in the list of suggested pairs is less than the entropy threshold value, the decoder logic 2070 may inform the validity logic 2060 so the validity logic 2060 can determine to perform corrective measures, determine the encoded data unit is corrupt, or begin standard decoder operations by searching for a MAC or ICV and decrypting the encoded data unit.

If corrective measures are not available, in some embodiments, the validity logic 2060 may determine that the encoded data unit is not valid or is corrupted and instruct the corruption logic 2064 so the corruption logic 2064 may perform further data integrity operations.

FIGS. 3A-C depict flowcharts of embodiments to encrypt and decrypt a data unit with a tag as well as merge the data unit with the tag and demerge the data unit and the tag. FIG. 3A illustrates a flowchart 3000 to encrypt and store unencrypted data in memory by memory logic such as the memory logic circuitry 2000 in FIG. 2 or the memory logic circuitry 1015, 1026, 1035, 1046, 1061, and/or 1096 in FIG. 1A. The flowchart 3000 begins with receipt of the unencrypted data unit by the memory logic circuitry (element 3010). The memory logic circuitry may perform pattern checks based on threshold values (element 3015) such as the pattern check logic 1200 in FIG. 1C to determine if the unencrypted data unit passes or fails. Alternatively, the memory logic circuitry may perform pattern checks based on entropy index values (element 3020). In further embodiments, the memory logic circuitry may optionally perform both the pattern checks based on threshold values (element 3015) and the perform pattern checks based on entropy index values (element 3020).

In many embodiments, the unencrypted data unit passes the pattern checks based on threshold values (element 3015) if at least one pattern is detected with a repetition or count of entities or occurrences of the at least one pattern that exceeds a corresponding threshold value for the at least one pattern. In some embodiments, if the unencrypted data unit passes the pattern checks with threshold values, the memory logic circuitry determines that the unencrypted data unit is low entropy and is compatible with the implicit integrity operations (element 3025).

The memory logic circuitry may perform the pattern checks based on entropy index values (element 3020) by performing pattern checks that determine the count of repetitions of patterns of entities in the data unit. Pattern check units such as the pattern check unit(s) illustrated in FIG. 1D may perform the pattern checks. In some embodiments, the pattern check units output a count for each pattern and transmit the counts to the entropy determination logic. The entropy determination logic may determine entropy index values for the counts from each of the pattern check units, determine the maximum entropy index value of the entropy index values, and compare the maximum entropy index value against an entropy threshold value. In several embodiments, the unencrypted data unit passes the pattern checks based on entropy index values (element 3020) if the maximum entropy index value exceeds the entropy threshold value. If the unencrypted data unit passes then the memory logic circuitry determines that the unencrypted data unit is valid or compatible with implicit integrity operations (element 3025).

For situations in which the unencrypted data unit is valid or compatible (element 3025), the memory logic circuitry may encode the unencrypted data unit with cryptographic operations to generate an encrypted data unit (element 3030) to store in memory (element 3035). In some embodiments, the memory logic circuitry merges a tag with the data unit in the encrypted data unit. In other embodiments, the memory logic circuitry does not merge a tag with the data unit in the encrypted data unit.

For situations in which the unencrypted data unit fails the pattern checks based on threshold values and/or the pattern checks based on entropy index values, the memory logic circuitry may determine that the unencrypted is corrupted or incompatible (element 3040). The memory logic circuitry may, for instance, test data units in memory that should be plaintext to determine if they are distinguishable from random data. In such embodiments, if the unencrypted data unit that should be plaintext is indistinguishable from random data by the pattern checks, the memory logic circuitry may determine that the unencrypted data unit is corrupted (element 3040). Once the memory logic circuitry determines that the unencrypted data unit is corrupted, the memory logic circuitry may perform corrective measures (element 3045) and send the corrected, unencrypted data unit to element 3015 to perform the pattern checks based on thresholds and/or to the element 3020 to perform the pattern checks with entropy index values.

If the unencrypted data unit is incompatible with implicit integrity operations, the memory logic circuitry may encode the unencrypted data unit with an alternative encoding/encrypting scheme (element 3050) to create an encoded data unit to store an encoded data unit in memory 3035.

FIG. 3B illustrates a flowchart 3100 for generating an encoded data unit to store in memory such as the implicit integrity operations of the encoder logic 2040 in FIG. 2. The flowchart begins with receiving a data unit to store in the memory (element 3110) by a memory logic circuitry such as the memory logic circuitry 2000 shown in FIG. 2. In some embodiments, the data unit may comprise data to store, e.g., on a data storage device, on a flash drive, or in cache. In further embodiments, the memory logic circuitry may receive a tag associated with the data unit. In other embodiments, the memory logic may generate a tag associated with the data unit.

After receiving a data unit to store in the memory, the memory logic circuitry may encode the data unit with a procedure that embeds the tag with the data unit in an encoded data unit that has the same number of bits as the data unit (element 3115). In other words, the encoded data unit is the same size as the data unit so the memory logic circuitry can store the tag with no extra storage overhead. In some embodiments, the procedure to encode the data unit with the tag is a cryptographic procedure that uses a master key and a tweak and generates additional keys and/or masks based on the master key and/or the tweak to encrypt the data unit and embed the tag.

FIG. 3C illustrates a flowchart for decoding an encrypted data unit by memory logic circuitry such as the memory logic circuitry 2000 in FIG. 2 or the memory logic circuitry 1015, 1026, 1035, 1046, 1061, and/or 1096 in FIG. 1A. The flowchart 3200 begins with decoding the encrypted data unit to determine a set of more than one suggested pairs where each pair comprises a data unit and a tag (element 3210). In such embodiments, the encrypted data unit is an encoded data unit such as the encoded data unit generated in the flowchart 3100 in FIG. 3B.

After determining the set of more than one pairs, the memory logic circuitry may determine entropy index values for each of the suggested data units in the set of more than one pairs (element 3215). The memory logic circuitry may determine the entropy index values based on sums or counts of repetitions of entities associated with patterns of bits in each of the data units.

The memory logic circuitry may determine from set of entropy index values, the largest entropy index value or maximum entropy index value (element 3220) and compare the maximum entropy index value to an entropy threshold value (element 3225). If the maximum entropy index value exceeds the entropy threshold value (element 3230), the memory logic circuitry may identify the suggested pair associated with the maximum entropy index value as the decoded data unit and tag (element 3250).

If the maximum entropy index value does not exceed the entropy threshold value (element 3230), the memory logic circuitry may perform one or more different data integrity actions. In some embodiments, the memory logic circuitry performs corrective measures to the encrypted data unit corrupt (element 3235) and starts again at the element 3210. In further embodiments, the memory logic circuitry performs an alternative decoding scheme to decode the encrypted data unit corrupt (element 3240). In many embodiments, the memory logic circuitry identifies the encrypted data unit as corrupt (element 3245).

Figure 4:
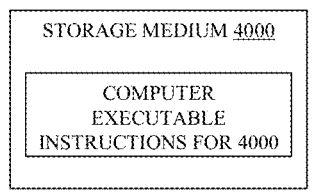
FIGS. 4-5 depict embodiments of a storage medium and a computing platform for implicit data integrity.

FIG. 4 illustrates an example of a storage medium 4000 to store processor data structures. Storage medium 4000 may comprise an article of manufacture. In some examples, storage medium 4000 may include any non-transitory computer readable medium or machine readable medium, such as an optical, magnetic or semiconductor storage. Storage medium 4000 may store various types of computer executable instructions, such as instructions to implement logic flows and/or techniques described herein. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 5:
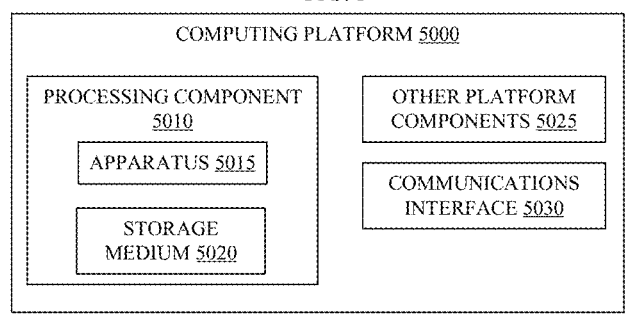

FIG. 5 illustrates an example computing platform 5000. In some examples, as shown in FIG. 5, computing platform 5000 may include a processing component 5010, other platform components or a communications interface 5030. According to some examples, computing platform 5000 may be implemented in a computing device such as a server in a system such as a data center or server farm that supports a manager or controller for managing configurable computing resources as mentioned above. Furthermore, the communications interface 5030 may comprise a wake-up radio (WUR) and may be capable of waking up a main radio of the computing platform 5000.

According to some examples, processing component 5010 may execute processing operations or logic for apparatus 5015 described herein. Processing component 5010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 5020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 5025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 5030 may include logic and/or features to support a communication interface. For these examples, communications interface 5030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 5000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 5000 described herein, may be included or omitted in various embodiments of computing platform 5000, as suitably desired.

The components and features of computing platform 5000 may be implemented using any combination of discrete circuitry, ASICs, logic gates and/or single chip architectures. Further, the features of computing platform 5000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 5000 shown in the block diagram of FIG. 5 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Several embodiments have one or more potentially advantages effects. For instance, implementing implicit integrity operations advantageously reduces data storage requirements and added reads and writes associated with standard data integrity operations that use, e.g., MACs and ICVs. Performing more than one pattern check to determine repetitions of entities within the data may advantageously distinguish a data unit from random data. Determining entropy index values and/or Boolean values and/or comparing the results to threshold values may advantageously determine if a data unit is valid or compatible. Merging a tag with the data unit without expanding the data unit to create an encoded data unit advantageously reduces data storage requirements and added reads and writes associated with standard data integrity operations that use, e.g., MACs and ICVs. Decoding and processing the encoded data unit to determine the data unit and the tag advantageously reduces data storage requirements and added reads and writes associated with standard data integrity operations that use, e.g., MACs and ICVs. Determining value histograms for two or more entities, determining a sum of repetitions of the two or more entities, and comparing the sum to a threshold value may advantageously distinguish a data unit from random data. Determining that a data unit is valid and/or if the data unit is corrupted may advantageously distinguish a data unit from random data or advantageously detect malware such as ransomware.

Examples of Further Embodiments

The following examples pertain to further embodiments. Specifics in the examples may be used anywhere in one or more embodiments.

Example 1 is an apparatus to determine integrity of a data unit. The apparatus comprises: a memory; and a memory logic circuitry coupled with the memory to perform more than one pattern check to determine repetitions of entities within the data unit, wherein the entities comprise patterns of two or more bits, wherein the more than one pattern check comprises a first pattern check to determine the repetitions of entities that are equal and a second pattern check to determine the repetitions of entities that are adjacent and equal; and to determine if the data unit is valid based on the repetitions of entities within the data unit determined by the more than one pattern check. In Example 2, the apparatus of Example 1, wherein the memory comprises one or more buffers, one or more registers, one or more levels of cache, one or more flash memories, one or more dynamic random-access memories, one or more hard drives, one or more solid-state drives, or a combination thereof. In Example 3, the apparatus of Example 1, wherein the memory logic circuitry comprises one or more circuits, one or more processors, code, or a combination thereof. In Example 4, the apparatus of Example 1, wherein the memory logic circuitry is configured to calculate entropy index values based on probabilities that the repetitions of entities occur in random data and determine if the data unit is valid based on comparison of the entropy index values to an entropy threshold value. In Example 5, the apparatus of Example 1, wherein the memory logic circuitry comprises threshold comparison logic to compare the repetitions of entities within the data unit to threshold values in a set of threshold values to distinguish the repetitions of entities within the data unit from random data.

In Example 6, the apparatus of Example 5, wherein the threshold comparison logic comprises a Boolean logic to assign a Boolean value for each of the more than one pattern check based on comparison of the repetitions of entities within the data unit to threshold values in the set of threshold values and performing a logical operation with the Boolean values to determine if the data unit is valid. In Example 7, the apparatus of Example 1, wherein the memory logic circuitry comprises maximum logic to determine a maximum entropy index value based on the entropy index values and entropy comparison logic to compare the maximum entropy index value to the entropy threshold value. In Example 8, the apparatus of Example 1, wherein the memory logic circuitry comprises validity logic to determine that the data unit is valid in response to a determination by a threshold comparison logic that a sum of repetitions of a first entity of the entities within the data unit exceeds a threshold value from the set of threshold values that is associated with the first entity, or a determination by an entropy comparison logic that at least one of the entropy index values exceeds the entropy threshold value, or both. In Example 9, the apparatus of Example 6, wherein the memory logic circuitry comprises validity logic to determine that the data unit is corrupted in response to a determination by threshold comparison logic that the repetitions of entities within the data unit fail to exceed any of the threshold values from the set of threshold values, a determination by an entropy comparison logic that all the entropy index values fail to exceed the entropy threshold value, or both. In Example 10, the apparatus of Example 2, wherein the memory logic circuitry comprises encoder logic to encode the data unit with a tag to create an encoded data unit, wherein the tag is embedded in the encoded data unit, wherein a length of the encoded data unit is the length of the data unit. In Example 11, the apparatus of Example 10, wherein the memory logic circuitry comprises decoder logic to decode the encoded data unit to determine the data unit and the tag, the decoder logic to decode the encoded data unit to produce more than one possible data unit and tag pair, wherein one pair of the more than one data unit and tag pair comprises the data unit and the tag, wherein the one pair is associated with a highest entropy index value amongst entropy index values for the pairs of the more than one data unit and tag pair, the highest entropy index value being greater than the entropy threshold value.

In Example 12, the apparatus of Example 1, wherein the memory logic circuitry comprises threshold comparison logic to compare the repetitions of entities within the data unit to threshold values in a set of threshold values to distinguish the repetitions of entities within the data unit from random data. In Example 13, the apparatus of Example 1, wherein the entities comprise nibbles, bytes, words, double-words, or a combination thereof. In Example 14, the apparatus of Example 1, wherein adjacent entities have continuous index positions. In Example 15, the apparatus of Example 1, wherein the memory logic circuitry comprises pattern check logic to detect entities in the data unit that are equal and are special values, wherein the special values are values that are frequently encountered in data units and infrequently encountered in random or corrupted data units. In Example 16, the apparatus of Example 1, wherein the more than one pattern check comprises a third pattern check to determine the repetitions of entities that have N highest counts, wherein N is a positive number. In Example 17, the apparatus of Example 1, wherein the memory logic circuitry comprises pattern check logic to determine value histograms for two or more entities and to determine a sum of repetitions of the two or more entities, and threshold comparison logic to compare the sum to a threshold value of the set of threshold values. In Example 18, a system to determine integrity of a data unit, the system comprising a processor coupled with the memory logic circuitry, wherein the memory comprises a dynamic random access memory coupled with the processor in accordance with any one of claims 1-17.

Example 19 is a method to determine integrity of a data unit. The method comprises: performing, by the memory logic circuitry, more than one pattern check to determine repetitions of entities within the data unit, wherein the entities comprise patterns of two or more bits; wherein the more than one pattern check comprises a first pattern check to determine the repetitions of entities that are equal and a second pattern check to determine the repetitions of entities that are adjacent and equal; and determining if the data unit is valid based on the repetitions of entities within the data unit determined by the more than one pattern check. In Example 20, the method of Example 19, further comprising comparing the repetitions of entities within the data unit to threshold values in a set of threshold values to distinguish the repetitions of entities within the data unit from random data. In Example 21, the method of Example 20, further comprising assigning a Boolean value for each of the more than one pattern check based on comparison of the repetitions of entities within the data unit to threshold values in the set of threshold values and performing a logical operation with the Boolean values to determine if the data unit is valid. In Example 22, the method of Example 19, further comprising determining a maximum entropy index value based on entropy index values for the data unit and comparing the maximum entropy index value to an entropy threshold value.

In Example 23, the method of Example 22, wherein the entropy threshold value is a security level associated with determining if the data unit is valid. In Example 24, the method of Example 19, further comprising determining that the data unit is valid by determining that a sum of repetitions of a first entity of the entities within the data unit exceeds a threshold value from the set of threshold values that is associated with the first entity and that at least one entropy index value exceeds an entropy threshold value. In Example 25, the method of Example 19, further comprising determining that the data unit is corrupted by determining that the repetitions of entities within the data unit fail to exceed any of the threshold values from the set of threshold values, determining that all the entropy index values fail to exceed an entropy threshold value, or both, wherein the entropy index values are determined based on probabilities that the repetitions of entities occur in random data. In Example 26, the method of Example 19, further comprising encoding the data unit with a tag to create an encoded data unit, wherein the tag is embedded in the encoded data unit, wherein a length of the encoded data unit is the length of the data unit. In Example 27, the method of Example 26, further comprising decoding the encoded data unit to determine the data unit and the tag, wherein decoding the encoded data unit produces more than one possible data unit and tag pair, wherein one pair of the more than one data unit and tag pair comprises the data unit and the tag, wherein the one pair is associated with a highest entropy index value amongst entropy index values for the pairs of the more than data unit and tag pair, the highest entropy index value being greater than the entropy threshold value. In Example 28, the method of Example 19, wherein performing the more than one pattern check comprises performing a first pattern check of the more than one pattern check based on a first threshold value of the set of threshold values and performing a second pattern check of the more than one pattern check based on a second threshold value of the set of threshold values. In Example 29, the method of Example 19, wherein performing the more than one pattern check comprises detecting entities in the data unit that are equal, wherein the entities comprise nibbles, bytes, words, double-words, or a combination thereof. In Example 30, the method of Example 19, wherein performing the more than one pattern check comprises detecting entities in the data unit that are equal and are placed at continuous index positions.

In Example 31, the method of Example 19, wherein performing the more than one pattern check comprises detecting entities in the data unit that are equal and are special values, wherein the special values are values that are frequently encountered in data units and infrequently encountered in random or corrupted data units. In Example 32, the method of Example 19, wherein performing the more than one pattern check comprises detecting entities in the data unit that are equal and are special values, wherein the special values comprise 0x00 and 0xFF. In Example 33, the method of Example 19, wherein performing the more than one pattern check comprises determining value histograms for two or more entities, determining a sum of repetitions of the two or more entities, and comparing the sum to a threshold value of the set of threshold values. In Example 34, a computer readable medium having stored thereon instructions that when executed cause a computer to perform operations comprising the operations of any one of examples 19-33. Example 35 is an apparatus to determine integrity of a data unit, the apparatus comprising a means for performing any one of examples 19-33. Example 36 is a program for causing a computer to perform operations comprising operations of any one of examples 19-33. Example 37 is a computer-readable storage medium for storing the program of example 36.

Example 38 is a system to determine integrity of a data unit. The system comprises: a memory comprising a dynamic random access memory; a processor coupled with the dynamic random access memory; and a memory logic circuitry coupled with the processor and the memory to perform more than one pattern check to determine repetitions of entities within the data unit, wherein the entities comprise patterns of two or more bits, wherein the more than one pattern check comprises a first pattern check to determine the repetitions of entities that are equal and a second pattern check to determine the repetitions of entities that are adjacent and equal; and to determine if the data unit is valid based on the repetitions of entities within the data unit determined by the more than one pattern check. In Example 39, the system of Example 38, wherein the memory comprises one or more buffers, one or more registers, one or more levels of cache, one or more flash memories, one or more hard drives, one or more solid-state drives, or a combination thereof. In Example 40, the system of Example 38, wherein the memory logic circuitry comprises one or more circuits, one or more processors, code, or a combination thereof.

In Example 41, the system of Example 38, wherein the memory logic circuitry comprises threshold comparison logic to compare the repetitions of entities within the data unit to threshold values in a set of threshold values to distinguish the repetitions of entities within the data unit from random data. In Example 42, the system of Example 41, wherein the threshold comparison logic comprises a Boolean logic to assign a Boolean value for each of the more than one pattern check based on comparison of the repetitions of entities within the data unit to threshold values in the set of threshold values and performing a logical operation with the Boolean values to determine if the data unit is valid. In Example 43, the system of Example 38, wherein the memory logic circuitry comprises maximum logic to determine a maximum entropy index value based on entropy index values for the data unit and entropy comparison logic to compare the maximum entropy index value to an entropy threshold value. In Example 44, the system of Example 38, wherein an entropy threshold value is a security level associated with determining if the data unit is valid. In Example 45, the system of Example 38, wherein the memory logic circuitry comprises validity logic to determine that the data unit is valid in response to a determination by a threshold comparison logic that a sum of repetitions of a first entity of the entities within the data unit exceeds a threshold value from the set of threshold values that is associated with the first entity and a determination by an entropy comparison logic that at least one entropy index value exceeds an entropy threshold value. In Example 46, the system of Example 38, wherein the memory logic circuitry comprises validity logic to determine that the data unit is corrupted in response to a determination by threshold comparison logic that the repetitions of entities within the data unit fail to exceed any threshold values from a set of threshold values, a determination by an entropy comparison logic that all entropy index values determined for the data unit fail to exceed an entropy threshold value, or both. In Example 47, the system of Example 38, wherein the memory logic circuitry comprises encoder logic to encode the data unit with a tag to create an encoded data unit, wherein the tag is embedded in the encoded data unit, wherein a length of the encoded data unit is the length of the data unit.

In Example 48, the system of Example 47, wherein the memory logic circuitry comprises decoder logic to decode the encoded data unit to determine the data unit and the tag, the decoder logic to decode the encoded data unit to produce more than one possible data unit and tag pair, wherein one pair of the more than one data unit and tag pair comprises the data unit and the tag, wherein the one pair is associated with a highest entropy index value amongst entropy index values for the pairs of the more than one data unit and tag pair, the highest entropy index value being greater than an entropy threshold value. In Example 49, the system of Example 38, wherein the memory logic circuitry comprises pattern check logic to perform a third pattern check of the more than one pattern check and a fourth pattern check of the more than one pattern check and threshold comparison logic to compare a count of occurrences of entities in a first pattern to a first threshold value of the set of threshold values and to compare a count of occurrences of entities in a second pattern to a second threshold value of the set of threshold values. In Example 50, the system of Example 38, wherein the memory logic circuitry comprises pattern check logic to detect entities in the data unit that are equal, wherein the entities comprise nibbles, bytes, words, double-words, or a combination thereof. In Example 51, the system of Example 38, wherein the memory logic circuitry comprises pattern check logic to detect entities in the data unit that are equal and are placed at continuous index positions. In Example 52, the system of Example 38, wherein the memory logic circuitry comprises pattern check logic to detect entities in the data unit that are equal and are special values, wherein the special values are values that are frequently encountered in data units and infrequently encountered in random or corrupted data units. In Example 53, the system of Example 38, wherein the memory logic circuitry is configured to calculate entropy index values based on probabilities that the repetitions of entities occur in random data and determine if the data unit is valid based on comparison of the entropy index values to an entropy threshold value. In Example 54, the system of Example 38, wherein the memory logic circuitry comprises pattern check logic to determine value histograms for two or more entities and to determine a sum of repetitions of the two or more entities, and threshold comparison logic to compare the sum to a threshold value of the set of threshold values.

Example 55 is a non-transitory machine-readable medium containing instructions, which when executed by a processor, cause the processor to perform operations, the operations comprising: performing, by the memory logic circuitry, more than one pattern check to determine repetitions of entities within the data unit, wherein the entities comprise patterns of two or more bits; wherein the more than one pattern check comprises a first pattern check to determine the repetitions of entities that are equal and a second pattern check to determine the repetitions of entities that are adjacent and equal; and determining if the data unit is valid based on the repetitions of entities within the data unit determined by the more than one pattern check. In Example 56, the machine-readable medium of Example 55, wherein the operations further comprise comparing the repetitions of entities within the data unit to threshold values in a set of threshold values to distinguish the repetitions of entities within the data unit from random data. In Example 57, the machine-readable medium of Example 55, wherein the operations further comprise assigning a Boolean value for each of the more than one pattern check based on comparison of the repetitions of entities within the data unit to threshold values in a set of threshold values and performing a logical operation with the Boolean values to determine if the data unit is valid. In Example 58, the machine-readable medium of Example 55, wherein the operations further comprise determining a maximum entropy index value based on entropy index values determined for the data unit and comparing the maximum entropy index value to a entropy threshold value. In Example 59, the machine-readable medium of Example 58, wherein the entropy threshold value is a security level associated with determining if the data unit is valid.

In Example 60, the machine-readable medium of Example 55, wherein the operations further comprise determining that the data unit is valid by determining that a sum of repetitions of a first entity of the entities within the data unit exceeds a threshold value from the set of threshold values that is associated with the first entity and that at least one entropy index value exceeds an entropy threshold value. In Example 61, the machine-readable medium of Example 55, wherein the operations further comprise determining that the data unit is corrupted by determining that the repetitions of entities within the data unit fail to exceed any threshold values from a set of threshold values, determining that all the entropy index values fail to exceed an entropy threshold value, or both. In Example 62, the machine-readable medium of Example 55, wherein the operations further comprise encoding the data unit with a tag to create an encoded data unit, wherein the tag is embedded in the encoded data unit, wherein a length of the encoded data unit is the length of the data unit. In Example 63, the machine-readable medium of Example 62, wherein the operations further comprise decoding the encoded data unit to determine the data unit and the tag, wherein decoding the encoded data unit produces more than one possible data unit and tag pair, wherein one pair of the more than one data unit and tag pair comprises the data unit and the tag, wherein the one pair is associated with a highest entropy index value amongst entropy index values for the pairs of the more than data unit and tag pair, the highest entropy index value being greater than an entropy threshold value. In Example 64, the machine-readable medium of Example 55, wherein performing the more than one pattern check comprises performing a first pattern check of the more than one pattern check based on a first threshold value of the set of threshold values and performing a second pattern check of the more than one pattern check based on a second threshold value of the set of threshold values. In Example 65, the machine-readable medium of Example 55, wherein performing the more than one pattern check comprises detecting entities in the data unit that are equal, wherein the entities comprise nibbles, bytes, words, double-words, or a combination thereof. In Example 66, the machine-readable medium of Example 55, wherein performing the more than one pattern check comprises detecting entities in the data unit that are equal and are placed at continuous index positions.

In Example 67, the machine-readable medium of Example 55, wherein performing the more than one pattern check comprises detecting entities in the data unit that are equal and are special values, wherein the special values are values that are frequently encountered in data units and infrequently encountered in random or corrupted data units. In Example 68, the machine-readable medium of Example 55, wherein the operations further comprise calculating entropy index values based on probabilities that the repetitions of entities occur in random data and determining if the data unit is valid based on comparison of the entropy index values to an entropy threshold value. In Example 69, the machine-readable medium of Example 55, wherein performing the more than one pattern check comprises determining value histograms for two or more entities, determining a sum of repetitions of the two or more entities, and comparing the sum to a threshold value of a set of threshold values.

Example 70 is an apparatus to determine integrity of a data unit. The apparatus comprises: a means for performing, by the memory logic circuitry, more than one pattern check to determine repetitions of entities within the data unit, wherein the entities comprise patterns of two or more bits; wherein the more than one pattern check comprises a first pattern check to determine the repetitions of entities that are equal and a second pattern check to determine the repetitions of entities that are adjacent and equal; and a means for determining if the data unit is valid based on the repetitions of entities within the data unit determined by the more than one pattern check. In Example 71, the apparatus of Example 70, further comprising a means for comparing the repetitions of entities within the data unit to threshold values in a set of threshold values to distinguish the repetitions of entities within the data unit from random data. In Example 72, the apparatus of Example 71, further comprising a means for assigning a Boolean value for each of the more than one pattern check based on comparison of the repetitions of entities within the data unit to threshold values in the set of threshold values and performing a logical operation with the Boolean values to determine if the data unit is valid. In Example 73, the apparatus of Example 70, further comprising a means for determining a maximum entropy index value based on entropy index values for the data unit and comparing the maximum entropy index value to an entropy threshold value. In Example 74, the apparatus of Example 73, wherein the entropy threshold value is a security level associated with determining if the data unit is valid. In Example 75, the apparatus of Example 70, further comprising a means for determining that the data unit is valid by determining that a sum of repetitions of a first entity of the entities within the data unit exceeds a threshold value from the set of threshold values that is associated with the first entity and that at least one entropy index value exceeds an entropy threshold value. In Example 76, the apparatus of Example 70, further comprising a means for determining that the data unit is corrupted by determining that the repetitions of entities within the data unit fail to exceed any of the threshold values from the set of threshold values, determining that all the entropy index values fail to exceed an entropy threshold value, or both, wherein the entropy index values are determined based on probabilities that the repetitions of entities occur in random data. In Example 77, the apparatus of Example 70, further comprising a means for encoding the data unit with a tag to create an encoded data unit, wherein the tag is embedded in the encoded data unit, wherein a length of the encoded data unit is the length of the data unit. In Example 78, the apparatus of Example 77, further comprising a means for decoding the encoded data unit to determine the data unit and the tag, wherein decoding the encoded data unit produces more than one possible data unit and tag pair, wherein one pair of the more than one data unit and tag pair comprises the data unit and the tag, wherein the one pair is associated with a highest entropy index value amongst entropy index values for the pairs of the more than data unit and tag pair, the highest entropy index value being greater than the entropy threshold value.

In Example 79, the apparatus of Example 70, wherein the means for performing the more than one pattern check comprises a means for performing a first pattern check of the more than one pattern check based on a first threshold value of the set of threshold values and performing a second pattern check of the more than one pattern check based on a second threshold value of the set of threshold values. In Example 80, the apparatus of Example 70, wherein the means for performing the more than one pattern check comprises a means for detecting entities in the data unit that are equal, wherein the entities comprise nibbles, bytes, words, double-words, or a combination thereof. In Example 81, the apparatus of Example 70, wherein the means for performing the more than one pattern check comprises a means for detecting entities in the data unit that are equal and are placed at continuous index positions. In Example 82, the apparatus of Example 70, wherein the means for performing the more than one pattern check comprises a means for detecting entities in the data unit that are equal and are special values, wherein the special values are values that are frequently encountered in data units and infrequently encountered in random or corrupted data units. In Example 83, the apparatus of Example 70, wherein the means for performing the more than one pattern check comprises a means for detecting entities in the data unit that are equal and are special values, wherein the special values comprise 0x00 and 0xFF. In Example 84, the apparatus of Example 70, wherein the means for performing the more than one pattern check comprises a means for determining value histograms for two or more entities, determining a sum of repetitions of the two or more entities, and comparing the sum to a threshold value of the set of threshold values.

What is claimed is:

1. An apparatus to determine integrity of a data unit, the apparatus comprising:
    memory comprising a data unit; and
    circuitry coupled with the memory, the circuitry configured to:
        identify repetitions of entities within the data unit, wherein the entities comprise patterns of two or more bits, perform a first pattern check to determine the repetitions of entities that are equal,
        calculate a first entropy index value based on a probability that the repetitions of entities within the data unit determined based on the first pattern check occur in random data,
        perform a second pattern check to determine the repetitions of entities that are adjacent and equal,
        calculate a second entropy index value based on a probability that the repetitions of entities within the data unit determined based on the second pattern check occur in random data,
        determine a maximum entropy index value as the greater of the first entropy index values and the second entropy index value, and
        determine if the data unit is valid based comparison of the maximum entropy index values to an entropy threshold value.

2. The apparatus of claim 1, wherein the circuitry is configured to:
    determine whether a sum of repetitions of a first entity of the entities within the data unit exceeds a threshold value from a set of threshold values that is associated with the first entity, or
    determine whether at least one of the entropy index values exceeds the entropy threshold value, and
    determine that the data unit is valid based on a determination that the sum of repetitions of the first entity of the entities within the data unit exceeds the threshold value from the set of threshold values or a determination that the at least one of the entropy index values exceeds the entropy threshold value.

3. The apparatus of claim 1, wherein the circuitry is configured to encode the data unit with a tag to create an encoded data unit, wherein the tag is embedded in the encoded data unit, wherein a length of the encoded data unit is the length of the data unit.

4. The apparatus of claim 3, wherein the circuitry is configured to:
    decode the encoded data unit to determine the data unit and the tag,
    decode the encoded data unit to produce more than one possible data unit and tag pair, wherein one pair of the more than one possible data unit and tag pair comprises the data unit and the tag, wherein the one pair is associated with a highest entropy index value amongst entropy index values for the pairs of the more than one data unit and tag pair, the highest entropy index value being greater than the entropy threshold value.

5. The apparatus of claim 1, wherein the circuitry is configured to compare the repetitions of entities within the data unit to threshold values in a set of threshold values to distinguish the repetitions of entities within the data unit from random data.

6. The apparatus of claim 1, wherein the circuitry is configured to perform a third pattern check to determine the repetitions of entities that have N highest counts, wherein N is a positive number.

7. A method to determine integrity of a data unit, the method comprising:
    performing, by circuitry, more than one pattern check to determine repetitions of entities within a data unit, wherein the entities comprise patterns of two or more bits, wherein the more than one pattern check comprises a first pattern check to determine the repetitions of entities that are equal and a second pattern check to determine the repetitions of entities that are adjacent and equal;
    calculate, by the circuitry, a first entropy index value based on a probability that the repetitions of entities within the data unit determined based on the first pattern check occur in random data;
    calculate, by the circuitry, a second entropy index value based on a probability that the repetitions of entities within the data unit determined based on the second pattern check occur in random data;
    determine, by the circuitry, a maximum entropy index value as the greater of the first entropy index values and the second entropy index value; and
    determine, by the circuitry, if the data unit is valid based comparison of the maximum entropy index values to an entropy threshold value.

8. The method of claim 7, further comprising encoding the data unit with a tag to create an encoded data unit, wherein the tag is embedded in the encoded data unit, wherein a length of the encoded data unit is the length of the data unit.

9. The method of claim 8, further comprising decoding the encoded data unit to determine the data unit and the tag, wherein decoding the encoded data unit produces more than one possible data unit and tag pair, wherein one pair of the more than one data unit and tag pair comprises the data unit and the tag, wherein the one pair is associated with a highest entropy index value amongst entropy index values for the pairs of the more than data unit and tag pair, the highest entropy index value being greater than the entropy threshold value.

10. The method of claim 7, wherein performing the more than one pattern check comprises detecting entities in the data unit that are equal, wherein the entities comprise nibbles, bytes, words, double-words, or a combination thereof.

11. The method of claim 7, wherein performing the more than one pattern check comprises detecting entities in the data unit that are equal and are placed at continuous index positions.

12. The method of claim 7, wherein performing the more than one pattern check comprises detecting entities in the data unit that are equal and are special values, wherein the special values are values that are frequently encountered in data units and infrequently encountered in random or corrupted data units.

13. The method of claim 7, wherein performing the more than one pattern check comprises determining value histograms for two or more entities, determining a sum of repetitions of the two or more entities, and comparing the sum to a threshold value of a set of threshold values.

14. A system to determine integrity of a data unit, the system comprising:
- memory comprising a dynamic random access memory;
- a processor coupled with the dynamic random access memory; and
- circuitry coupled with the processor and the memory to perform more than one pattern check to:
  - determine repetitions of entities within the data unit, wherein the entities comprise patterns of two or more bits, wherein the more than one pattern check comprises a first pattern check to determine the repetitions of entities that are equal and a second pattern check to determine the repetitions of entities that are adjacent and equal;
  - calculate a first entropy index value based on a probability that the repetitions of entities within the data unit determined based on the first pattern check occur in random data;
  - calculate a second entropy index value based on a probability that the repetitions of entities within the data unit determined based on the second pattern check occur in random data;
  - determine a maximum entropy index value as the greater of the first entropy index values and the second entropy index value; and
  - determine if the data unit is valid based comparison of the maximum entropy index values to an entropy threshold value.

15. The system of claim 14, wherein the memory comprises one or more buffers, one or more registers, one or more levels of cache, one or more flash memories, one or more hard drives, one or more solid-state drives, or a combination thereof.

16. The system of claim 14, wherein the circuitry is configured to detect entities in the data unit that are equal, wherein the entities comprise nibbles, bytes, words, double-words, or a combination thereof.

17. A non-transitory machine-readable medium containing instructions, which when executed by a processor, cause the processor to:
- perform more than one pattern check to determine repetitions of entities within a data unit, wherein the entities comprise patterns of two or more bits, and wherein the more than one pattern check comprises a first pattern check to determine the repetitions of entities that are equal and a second pattern check to determine the repetitions of entities that are adjacent and equal;
- calculate, by the circuitry, a first entropy index value based on a probability that the repetitions of entities within the data unit determined based on the first pattern check occur in random data;
- calculate, by the circuitry, a second entropy index value based on a probability that the repetitions of entities within the data unit determined based on the second pattern check occur in random data;
- determine, by the circuitry, a maximum entropy index value as the greater of the first entropy index values and the second entropy index value; and
- determine whether the data unit is valid based comparison of the maximum entropy index values to an entropy threshold value.

18. The machine-readable medium of claim 17, wherein performing the more than one pattern check comprises performing a first pattern check of the more than one pattern check based on a first threshold value of a set of threshold values and performing a second pattern check of the more than one pattern check based on a second threshold value of the set of threshold values.

* * * * *